United States Patent
Wang et al.

(10) Patent No.: US 12,114,049 B2
(45) Date of Patent: Oct. 8, 2024

(54) PRODUCT OBJECT INFORMATION PROVIDING METHOD, APPARATUS, AND ELECTRONIC DEVICE

(71) Applicant: Alibaba Group Holding Limited, Grand Cayman (KY)

(72) Inventors: Shu Wang, Hangzhou (CN); Wenliang Li, Hangzhou (CN); Qin Xu, Hangzhou (CN); Yishu Liang, Hangzhou (CN); Yanan Hao, Hangzhou (CN); Yueshan Zhang, Hangzhou (CN); Hao Chen, Hangzhou (CN); Zhou Yang, Hangzhou (CN); Na An, Hangzhou (CN); Xiang Duan, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 17/990,594

(22) Filed: Nov. 18, 2022

(65) Prior Publication Data
US 2023/0110542 A1   Apr. 13, 2023

Related U.S. Application Data

(63) Continuation of application No. PCT/CN2021/094095, filed on May 17, 2021.

(30) Foreign Application Priority Data

May 19, 2020   (CN) .......................... 20201042736.X

(51) Int. Cl.
*H04N 21/81*   (2011.01)
*H04N 21/2187*   (2011.01)
(Continued)

(52) U.S. Cl.
CPC ....... *H04N 21/812* (2013.01); *H04N 21/2187* (2013.01); *H04N 21/23412* (2013.01); *H04N 21/4316* (2013.01); *H04N 21/482* (2013.01)

(58) Field of Classification Search
CPC ............. H04N 21/812; H04N 21/2187; H04N 21/23412; H04N 21/4316; H04N 21/482
See application file for complete search history.

(56) References Cited

U.S. PATENT DOCUMENTS

| 8,752,112 B2 | 6/2014 | Krasic et al. |
| 8,855,469 B2 | 10/2014 | Maharajh et al. |

(Continued)

FOREIGN PATENT DOCUMENTS

| CN | 105828123 A | 8/2016 |
| CN | 110428310 A | 11/2019 |

(Continued)

OTHER PUBLICATIONS

English Translation of International Search Report for PCT Application No. PCT/CN2021/094095 dated Aug. 16, 2021, 2 pages.

(Continued)

*Primary Examiner* — Mulugeta Mengesha
(74) *Attorney, Agent, or Firm* — Lee & Hayes, P.C.

(57) ABSTRACT

A method, an apparatus, and an electronic device for providing product object information are disclosed. The method includes: providing an interactive content in a process of playing a live video content associated with a product object, the interactive content being generated according to a material associated with the product object, and the material being used to describe attributes of the product object; and providing a change process of the interactive content according to the material in a process of responding to interactive operation information inputted by a user, to enable a presentation of multiple attributes of the product object.

(Continued)

Through the embodiments of the present disclosure, the product object information can be provided to consumers in a more comprehensive and intuitive manner, so as to help the users to make better shopping decisions.

19 Claims, 31 Drawing Sheets

(51) Int. Cl.
   *H04N 21/234* (2011.01)
   *H04N 21/431* (2011.01)
   *H04N 21/482* (2011.01)

(56) References Cited

U.S. PATENT DOCUMENTS

| | | | |
|---|---|---|---|
| 8,924,261 B2 | 12/2014 | Stinchcomb | |
| 10,933,209 B2 | 3/2021 | Advani | |
| 10,967,255 B2 | 4/2021 | Rosado | |
| 11,227,328 B2 | 1/2022 | Yin et al. | |
| 2008/0098425 A1* | 4/2008 | Welch | H04N 21/478 725/37 |
| 2008/0163283 A1* | 7/2008 | Tan | H04N 21/43074 725/20 |
| 2008/0209480 A1* | 8/2008 | Eide | H04N 21/47202 348/E7.071 |
| 2010/0306805 A1* | 12/2010 | Neumeier | H04N 21/8126 725/60 |
| 2012/0185886 A1* | 7/2012 | Charania | H04N 21/8173 725/2 |
| 2013/0166382 A1* | 6/2013 | Cassidy | H04N 21/25875 705/14.55 |
| 2016/0027067 A1* | 1/2016 | Zindler | H04N 21/4725 705/14.72 |
| 2016/0065880 A1* | 3/2016 | Pearson | H04N 21/2665 348/14.07 |
| 2017/0195744 A1 | 7/2017 | Engel et al. | |
| 2017/0318355 A1* | 11/2017 | E | H04N 21/431 |
| 2019/0174165 A1 | 6/2019 | Pizzurro et al. | |
| 2019/0197587 A1* | 6/2019 | Paul | G06Q 50/01 |

FOREIGN PATENT DOCUMENTS

| | | |
|---|---|---|
| CN | 110830810 A | 2/2020 |
| CN | 111105483 A | 5/2020 |
| EP | 1225763 A1 | 7/2002 |
| EP | 3084582 A1 | 10/2016 |

OTHER PUBLICATIONS

English Translation of Written Opinion for PCT Application No. PCT/CN2021/094095 dated Aug. 16, 2021, 4 pages.
U.S. Appl. No. 12/609,355, filed Dec. 30, 2014, UKN.
English Translation of Chinese Office Action dated Jul. 15, 2023 for corresponding Chinese Application No. 202010427361.X, 11 pages.
English Translation of Chinese Second Office Action of Chinese Patent Application No. 202010427361.X for corresponding U.S. Appl. No. 17/990,594 dated Feb. 9, 2024.
Search Report for European Application No. 21809564.4, Dated May 14, 2024, 7 pages.

* cited by examiner

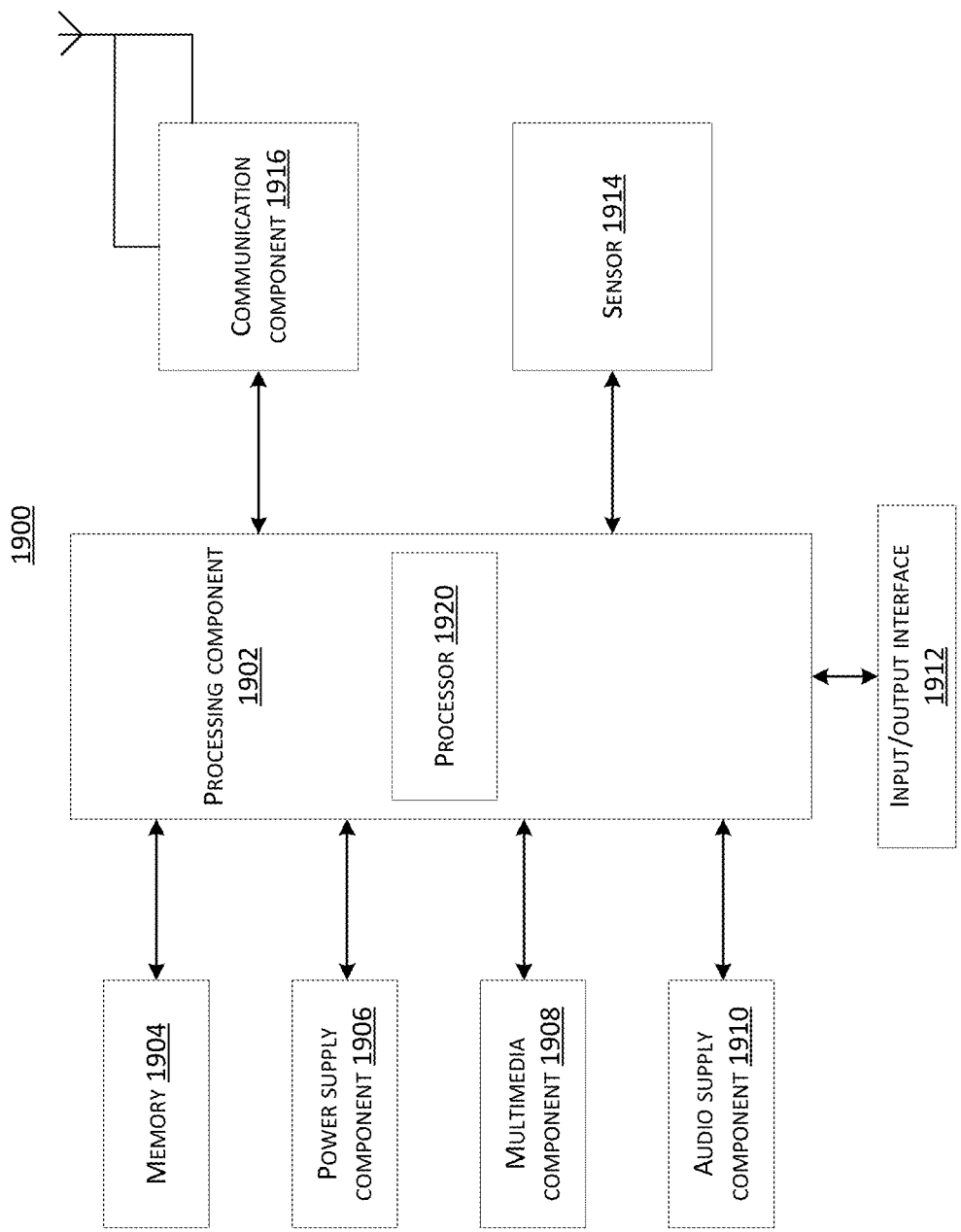

PRODUCT OBJECT INFORMATION PROVIDING METHOD, APPARATUS, AND ELECTRONIC DEVICE

CROSS REFERENCE TO RELATED PATENT APPLICATIONS

This application claims priority to and is a continuation of PCT Patent Application No. PCT/CN2021/094095 filed on 17 May 2021, and is related to and claims priority to Chinese Application No. 202010427361.X, filed on 19 May 2020 and entitled "Product Object Information Providing Method, Apparatus, and Electronic Device," which are incorporated herein by reference in their entirety.

TECHNICAL FIELD

The present disclosure relates to the technical field of product object information processing, and in particular, to methods, apparatuses, and electronic devices for providing product object information.

BACKGROUND

In traditional product object information service systems, product object information can usually be described in form of pictures, text, videos, etc. With the popularization of mobile communication technologies and mobile devices, a solution for describing product object information by means of a three-dimensional model has also emerged, so that users can understand the details of product objects comprehensively from multiple perspectives. In addition, in existing technologies, live broadcast technology is also introduced into the product object information service systems, and merchants or sellers can introduce product objects through live broadcast. Compared with pictures, text and pre-shot videos, information dimension of video is presented more abundantly by live broadcast. Combined with the broadcaster's description, a certain interaction between consumers and the broadcaster is formed, which can enable the consumers to better integrate into a shopping scene. Among them, the interactive content mainly focuses on interactive forms of marketing, such as comments, likes, etc.

In short, product object information can be described in various ways in the existing technologies. However, how to provide product object information to consumers in a more comprehensive and intuitive way to help users make better shopping decisions is always the goal of continuous pursuit and improvement of the product object information service systems.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer readable instructions as permitted by the context above and throughout the present disclosure.

The present disclosure provides a method, an apparatus, and an electronic device for providing product object information, which can provide product object information to consumers in a more comprehensive and intuitive way, so as to help users make better shopping decisions.

The present disclosure provides the following solutions:

A method for providing product object information includes:
  providing an interactive content in a process of playing a video content associated with a product object, the interactive content being generated according to a material associated with the product object, and the material being used to describe attributes of the product object; and
  providing a change process of the interactive content according to the material in a process of responding to interactive operation information inputted by a user, to enable a presentation of multiple attributes of the product object.

A method for providing product object information includes:
  storing, by a server, an interactive content corresponding to a product object, the interactive content being generated according to a material associated with the product object, and the material being used to describe attributes of the product object;
  receiving a request for delivery of interactive content to a target video content, the request including information of an associated target product object identification and information of a target interactive content identification; and
  providing the interactive content corresponding to the target interactive content identification to a viewer's client of the video content, to enable the viewer's client to provide the interactive content in a process of playing the video content, and providing a change process of the interactive content according to the material in a process of responding to interactive operation information inputted by a user.

A method for providing product object information includes:
  providing an option of operation for delivering an interactive content according to a progress of a live broadcast during the live broadcast, the interactive content being generated according to a material associated with a product object, and the material being used to describe attributes of the product object;
  determining an identification of a target live broadcast session and an identification of a target product object after receiving a delivery operation request through the option of operation;
  obtaining and presenting a list of selectable interactive contents according to the identification of the target product object, wherein the list is used to display identification information of interactive contents associated with the target product object and pre-submitted to a server; and
  submitting a target list item to the server after being selected, to enable the server to provide an interactive content associated with the target list item to a viewer's client of the target live broadcast session, the viewer's client providing the interactive content in a process of playing a content of the live broadcast, and providing a change process of the interactive content according to the material in a process of responding to interactive operation information inputted by a user.

A method for providing product object information includes:

providing an option of operation for delivering an interactive content to a current live broadcast's session in a live broadcast interface of a user client of a broadcaster;

determining an identification of a target product object after receiving a placing operation request through the option of operation;

obtaining and displaying a list of selectable interactive contents according to the identification of the target product object, where the list is used to display identification information of interactive contents associated with the target product object and pre-submitted to a server; and submitting a target list item to the server after being selected, to enable the server to provide an interactive content associated with the target list item to a viewer's user client of the current live broadcast's session, and the viewer's user client providing the interactive content in a process of playing the live broadcast's content, and providing a change process of the interactive content according to a material in a process of responding to interactive operation information inputted by a user.

A method for providing product object information includes:

providing an option of operation for initiating an interaction in a target page associated with a product object;

providing an interactive content after receiving an interaction request through the option of operation, the interactive content being generated according to a material associated with the product object, and the material being used to describe attributes of the product object;

providing multiple interactive channels for inputting interactive operation information by selecting one of the interactive channels, wherein different interactive channels correspond to different input methods of interactive operation information; and providing a change process of the interactive content according to the material to enable presentation of multiple attributes of the product object in a process of responding to interactive operation information inputted by a user.

A method for providing product object information includes:

providing an option of operation for initiating an interaction in a target page associated with a product object;

providing an interactive content after receiving an interaction request through the option of operation, the interactive content being generated according to a material associated with the product object, and the material being used to describe attributes of the product object;

receiving interactive operation information inputted through an air gesture; and providing a change process of the interactive content according to the material, to enable presentation of multiple attributes of the product object in a process of responding to interactive operation information inputted by a user.

An apparatus for providing product object information includes:

an interactive content providing unit configured to provide an interactive content in a process of playing a video content associated with a product object, the interactive content being generated according to a material associated with the product object, and the material being used to describe attributes of the product object; and an interactive response unit configured to provide a change process of the interactive content according to the material in a process of responding to interactive operation information inputted by a user, to enable a presentation of multiple attributes of the product object.

An apparatus for providing product object information, which is applied to a server, includes:

an interactive content storage unit configured to store an interactive content corresponding to a product object, the interactive content being generated according to a material associated with the product object, and the material being used to describe attributes of the product object;

a delivery request receiving unit configured to receive a request for delivery of interactive content to a target video content, the request including information of an associated target product object identification and information of a target interactive content identification; and an interactive content providing unit configured to provide the interactive content corresponding to the target interactive content identification to a viewer's client of the video content, to enable the viewer's client to provide the interactive content in a process of playing the video content, and provide a change process of the interactive content according to the material in process of responding to interactive operation information inputted by a user.

An apparatus for providing product object information includes:

a first operation option providing unit configured to provide an option of operation for delivering an interactive content according to a progress of a live broadcast during the live broadcast, the interactive content being generated according to a material associated with a product object, and the material being used to describe attributes of the product object;

a first product object identification determination unit configured to determine an identification of a target live broadcast session and an identification of a target product object after receiving a delivery operation request through the option of operation;

a first interactive content list display unit configured to obtain and present a list of selectable interactive contents according to the identification of the target product object, wherein the list is used to display identification information of interactive contents associated with the target product object and pre-submitted to a server; and a first selection result submission unit configured to submit a target list item to the server after being selected, to enable the server to provide an interactive content associated with the target list item to a viewer's client of the target live broadcast session, the viewer's client providing the interactive content in a process of playing a content of the live broadcast, and provide a change process of the interactive content according to the material in a process of responding to interactive operation information inputted by a user.

An apparatus for providing product object information includes:

a second operation option providing unit configured to provide an option of operation for delivering an interactive content to a current live broadcast's session in a live broadcast interface of a user client of a broadcaster;

a second product object identification determination unit configured to determine an identification of a target product object after receiving a placing operation request through the option of operation;

a second interactive content list display unit configured to obtain and display a list of selectable interactive contents according to the identification of the target product object, where the list is used to display identification information of interactive contents associated with the target product object and pre-submitted to a server; and a second selection result submission unit configured to submit a target list item to the server after being selected, to enable the server to provide an interactive content associated with the target list item to a viewer's user client of the current live broadcast's session, and the viewer's user client providing the interactive content in a process of playing the live broadcast's content, and provide a change process of the interactive content according to a material in a process of responding to interactive operation information inputted by a user.

An apparatus for providing product object information includes:

an operation option providing unit configured to provide an option of operation for initiating an interaction in a target page associated with a product object;

an interactive content providing unit configured to provide an interactive content after receiving an interaction request through the option of operation, the interactive content being generated according to a material associated with the product object, and the material being used to describe attributes of the product object;

an interactive channel providing unit configured to provide multiple interactive channels for inputting interactive operation information by selecting one of the interactive channels, wherein different interactive channels correspond to different input methods of interactive operation information; and an interactive response unit configured to provide a change process of the interactive content according to the material to enable presentation of multiple attributes of the product object in a process of responding to interactive operation information inputted by a user.

An apparatus for providing product object information includes:

an operation option providing unit configured to provide an option of operation for initiating an interaction in a target page associated with a product object;

an interactive content providing unit configured to provide an interactive content after receiving an interaction request through the option of operation, the interactive content being generated according to a material associated with the product object, and the material being used to describe attributes of the product object;

an interactive operation information receiving unit configured to receive interactive operation information inputted through an air gesture; and an interactive response unit configured to provide a change process of the interactive content according to the material, to enable presentation of multiple attributes of the product object in a process of responding to interactive operation information inputted by a user.

According to specific embodiments provided by the present disclosure, the present disclosure discloses the following technical effects:

Through the embodiments of the present disclosure, an interactive content can be provided in a process of introducing product object information through a video. This interactive content is different from likes, comments, and dialogues with broadcasters in the existing technologies, and is generated based on a material associated with a product object. This kind of material is used to describe specific attributes of the product object, which can specifically include 3D model(s), picture(s), video(s), etc. of the product object. In this way, a user can also interact with specific interactive content when viewing video content of the product object. During a process of interaction, the user can input a specific interactive operation, and correspondingly, a corresponding change to the interactive content can be sent along with the interactive operation in order to display attribute information of product objects in various dimensions and states. In this way, the video content and the interactive content of the product object complement each other, and provide the user with more comprehensive and richer detailed information of the product object, thereby better helping the user to make a shopping decision.

In an optional implementation, a variety of interactive channels can also be provided for the user, so that the user can input specific interactive operation information in various ways, which include voice interaction, touch screen interaction, and the like. By customizing a specific interactive channel for a specific interactive theme, the basis of customization can be the characteristics of a material associated with the interactive theme in the display process. As such, a more suitable interactive channel can be selected for the specific interactive theme, which facilitates interactive operations of user inputs, while also enabling the user to obtain an experience that is closer to the actual offline experience of the physical product object.

The user can also be provided with interactive channels for air gestures, so that the user can input specific interactive operation information through an air gesture. In this way, the user does not need to touch the screen of a terminal device during an interaction process. In addition, specific air gestures can be designed according to operation modes in actual operations corresponding to a physical product object, so that the user can obtain an experience that is closer to offline operations of the physical object during the interaction process.

Apparently, implementing any product of the present disclosure does not necessarily need to achieve all of the advantages described above at the same time.

BRIEF DESCRIPTION OF THE DRAWINGS

In order to more clearly illustrate the technical solutions of the embodiments of the present disclosure or existing technologies, accompanying drawings needed by the embodiments will be briefly introduced below. Apparently, the drawings described below represent only some of the present disclosure. One of ordinary skill in the art can also obtain other drawings can also be obtained based on these drawings without making any creative effort.

FIGS. 3-1 to 3-7 are schematic diagrams of an interaction process provided by the embodiments of the present disclosure.

FIG. 4 is a schematic diagram of a background configuration interface provided by the embodiments of the present disclosure.

FIGS. 5-1 to 5-3 are schematic diagrams of air gesture operations provided by the embodiments of the present disclosure.

FIGS. 6-1 to 6-3 are schematic diagrams of a multi-channel selection method provided by the embodiments of the present disclosure.

FIGS. 7-1 to 7-3 are schematic diagrams of another multi-channel selection method provided by the embodiments of the present disclosure.

FIG. 19 is a schematic diagram of an electronic device provided by the embodiments of the present disclosure.

DETAILED DESCRIPTION

Figure 1:
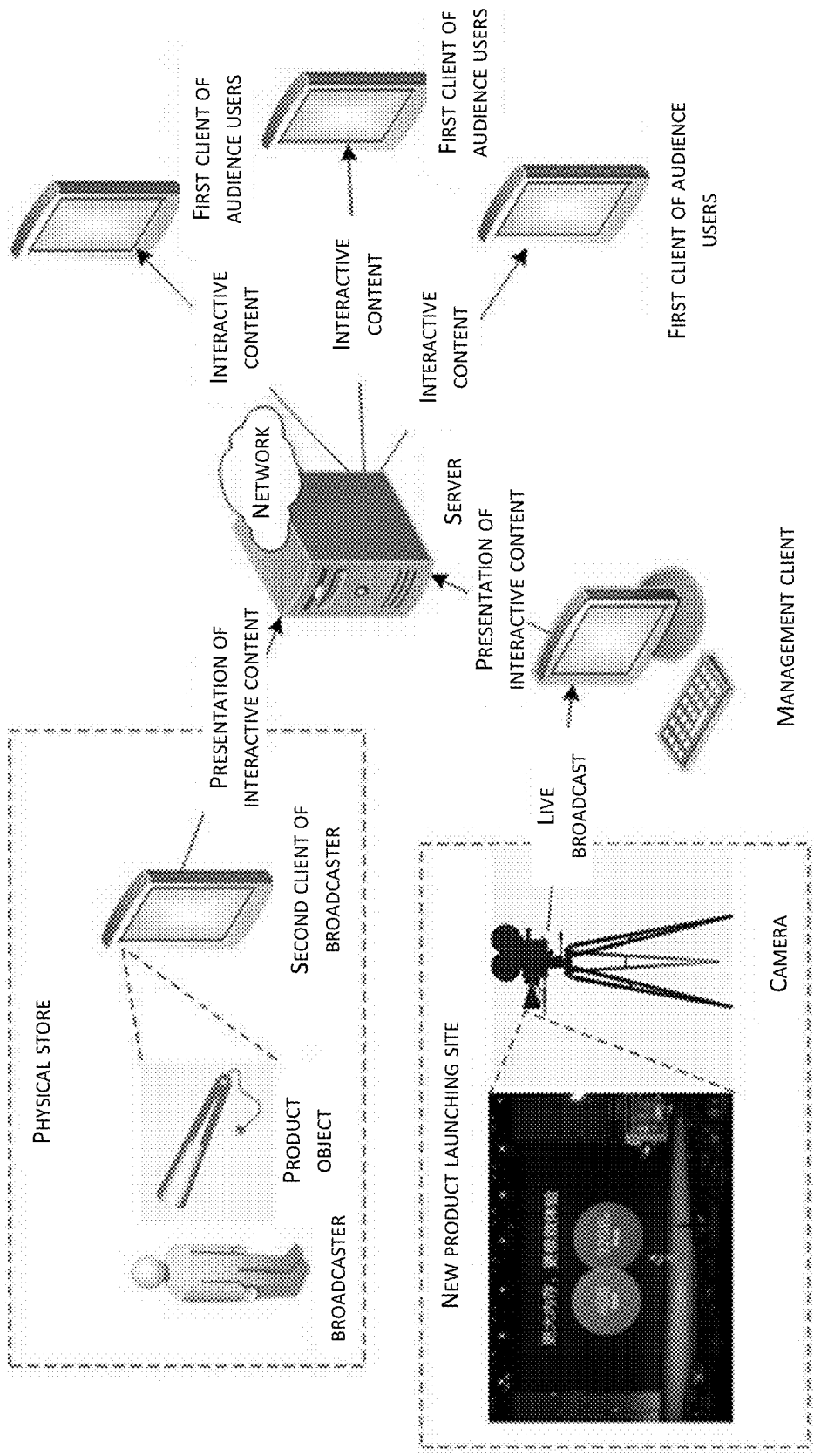
FIG. 1 is a schematic diagram of a system architecture provided by the embodiments of the present disclosure.

The technical solutions in the embodiments of the present disclosure will be clearly and completely described below with reference to the drawings in the embodiments of the present disclosure. Apparently, the described embodiments represent only some and not all of the embodiments of the present disclosure. Based on the embodiments in the present disclosure, all other embodiments that are obtained by one of ordinary skill in the art shall fall within the scope of protection of the present disclosure.

In the embodiments of the present disclosure, in order to enable users to obtain more comprehensive and intuitive information about product objects, corresponding solutions are provided. In these solutions, firstly, a user can be provided with an interactive content based on a video content (for example, live broadcast, etc.) associated with a product object. This type of interactive content is different from marketing forms, such as comments and likes, etc., in the existing technologies, and is an interactive content generated according to a material associated with the product object, and this material can be used to describe attribute information of the product object. For example, a three-dimensional model of the product object, etc., may be included, which can be used to describe appearance attributes of the product object. At the same time, real-time changes of the interactive content can be provided according to interactive operation instructions inputted by the user. For example, the user inputs an instruction such as rotation, etc., and the three-dimensional model of the product object in the interactive content can be rotated along a direction of the interactive instruction, so that the user can view appearance details of the product object from other perspectives, and so on. In this way, since the above-mentioned interactive process is provided in the process of playing the video content, that is, while the information of the product object is introduced in the video content, the user can obtain more detailed information about the product object through interaction. As such, the video content and the interactive content can complement each other, so that the user can obtain more comprehensive and intuitive information about the product object.

Specifically, an interactive content can be generated according to a material describing attribute information of a product object in a certain dimension, and the same product object can correspond to materials in multiple dimensions. In other words, a user can obtain an interactive experience in multiple dimensions, which may include, for example, interactions of multi-view or multi-dimensional presentation of the appearance, or interactions of presentation from the appearance to the internal structure or details in multiple states, or may also include interactions for presenting processes installation and control and/or usage effects under a usage state, interactions during changes in performance and attribute, etc.

In implementations, a variety of interactive channels can also be provided for a user, so that the user can input interactive operation information in various ways, which include a voice input channel and a touch screen input channel. In addition, the present disclosure can also provide an air gesture input channel, that is, a user can input interactive operation information by making certain gestures in the air without the need of touching the screen, and so on.

Specifically, from the perspective of system architecture, referring to FIG. 1, the embodiments of the present disclosure may involve a server and first clients of a product object information service system. The first clients mainly refer to clients provided to users such as consumers, buyers, etc. These users are mainly audience users. Video content (for example, live broadcast content provided by a broadcaster, etc.) is played through a first client. In the embodiments of the present disclosure, the server may put an interactive content into a specific video content during a video playback process, so that an audience user can view the interactive content when viewing the video content through the first client, and a specific interaction process is realized through the first client. In addition, in implementations, the interactive content delivered in the specific video content can be delivered by the server according to preset rules, etc., or, in another way, for a live broadcast scene, can also be delivered by a broadcaster or a backend management party during live broadcast. For example, for a daily live broadcast scenario initiated by a merchant or seller user as a broadcaster, the broadcaster conducts a live broadcast in a place such as his own physical store, for example, and introduces product objects in the store, etc. In this case, the broadcaster can determine whether to deliver an interactive content, when to deliver the interactive content, what kind of interactive content to deliver, and the like during the live broadcast. In another case, the live broadcast may also be a live broadcast of a launch event of a new product object. In this case, a management client in the backend can also be provided, and the management client can provide an option of operation for delivering interactive content(s) in the live broadcast, so that management personnel can place specific interactive contents into the live broadcast at some key time points, etc. according to the progress of the live broadcast, for example.

Specific implementation solutions provided by the embodiments of the present disclosure are described in detail below.

First Embodiment

Figure 2:
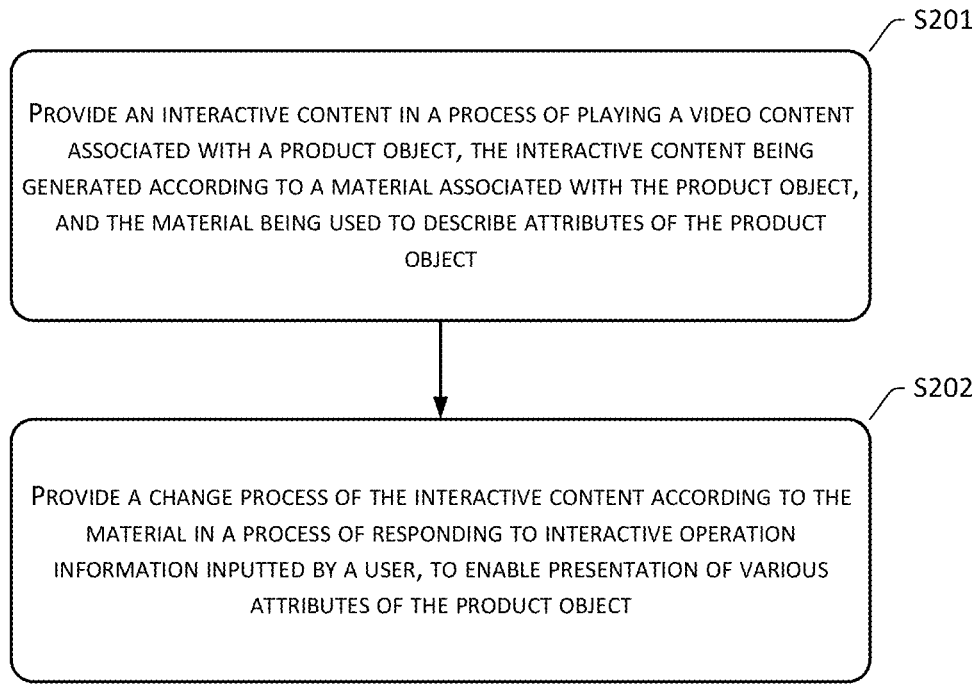
FIG. 2 is a flowchart of a first method provided by the embodiments of the present disclosure.

First, the first embodiment provides a method for providing product object information from the perspective of a first client. Referring to FIG. 2, the method may specifically include:

S201: Provide an interactive content in a process of playing a video content associated with a product object, the interactive content being generated according to a material associated with the product object, and the material being used to describe attributes of the product object.

The video content may include the content of a live broadcast, or may also be other pre-recorded video content, and the like. The content of the live broadcast may also include the real-time content of the live broadcast, or the re-visited content of the live broadcast after the live broadcast ends, and so on.

Figures 1, 3:
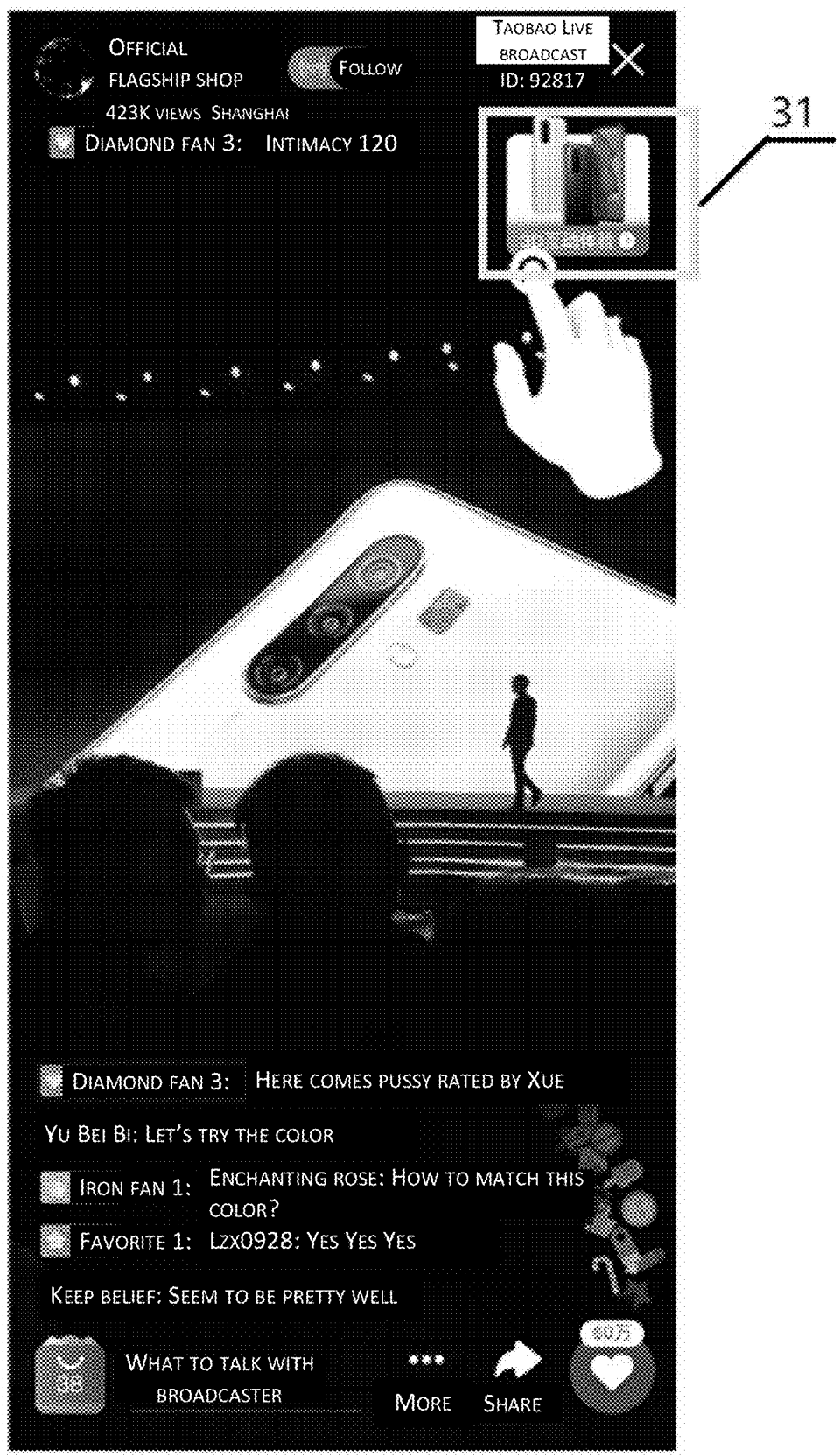
Figures 2, 3:
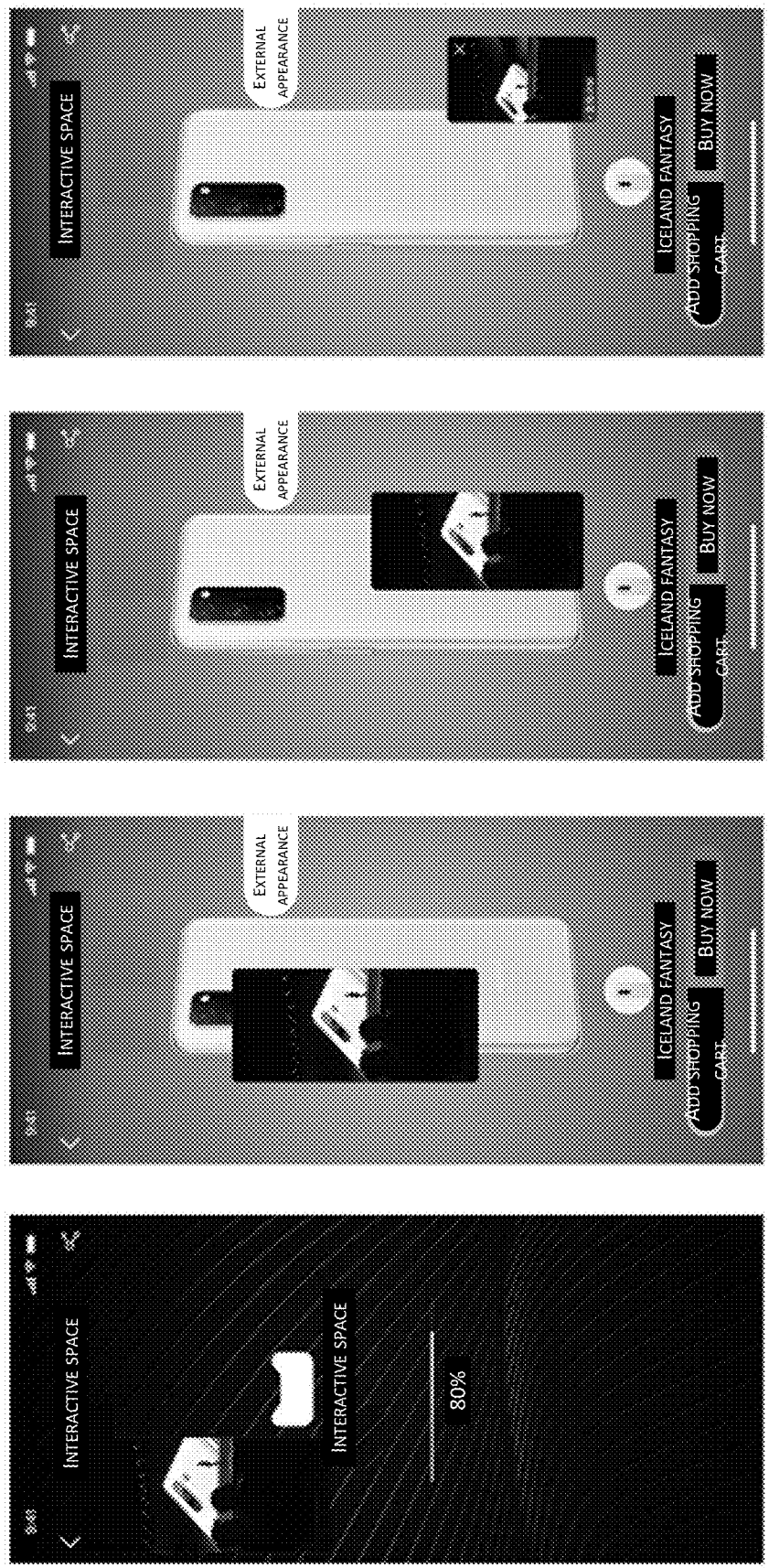
Figure 3:
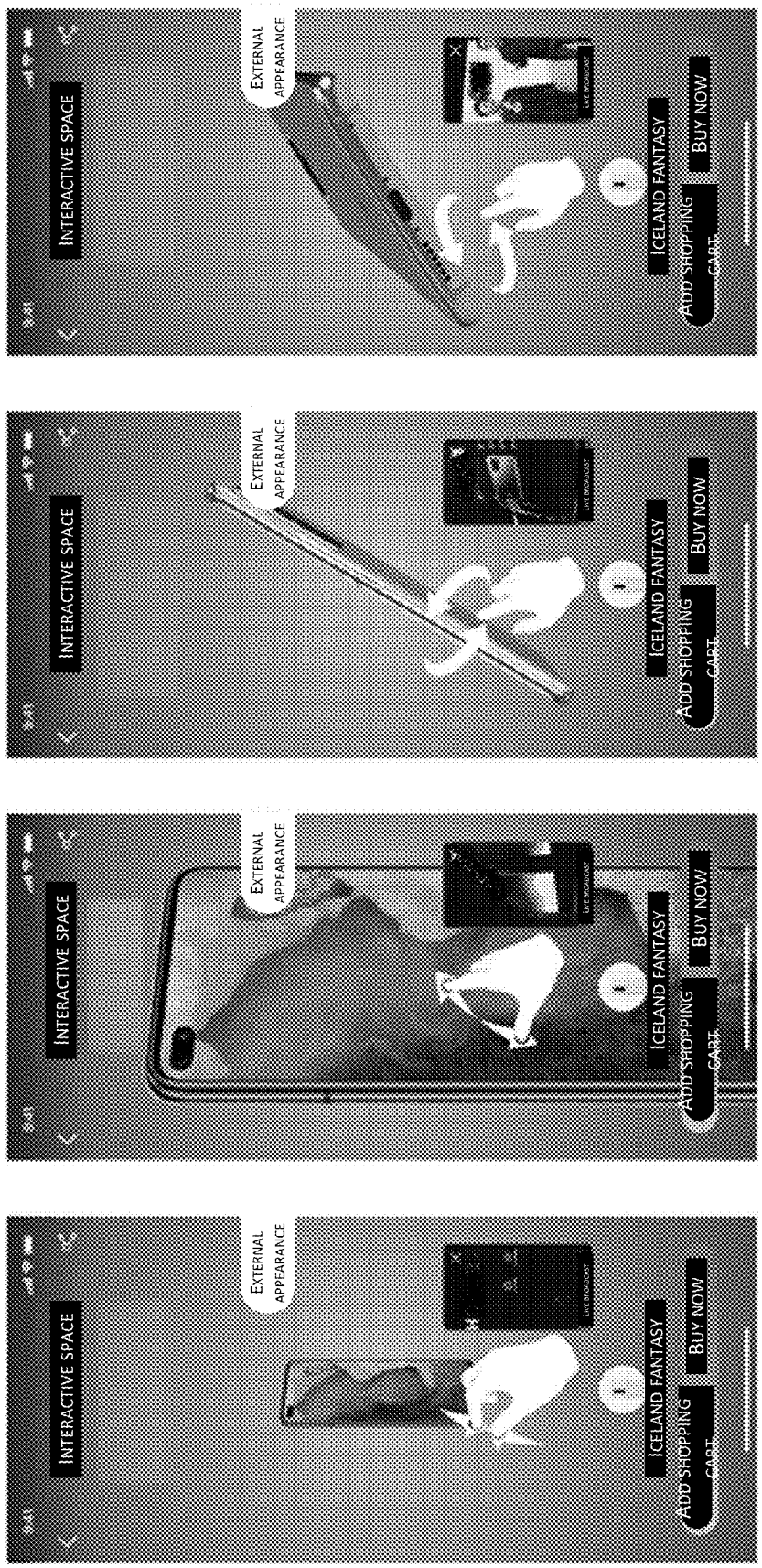

Specifically, when an interactive content is provided during the playback of a video content, a variety of methods may exist. For example, a live broadcast process is used as an example. In one of the methods, with reference to FIG. 3-1, firstly, an option of operation 31 for initiating interaction can be provided in the upper right corner, for example, of a live broadcast interface, which for example, can be displayed as "3D interactive experience", etc. Afterwards, after receiving an operation request for initiating interaction through the option of operation, an interactive interface can be created, and an interactive content is then provided in the interactive interface. In addition, in order to enable a user to still view the content of live broadcast during the interaction process, after the interactive interface is created, a window to which the live broadcast interface belongs can be reduced, and can be presented above the interactive interface in a form of picture-in-picture. For example, FIG. 3-2 shows a change process of an interface after receiving an interaction request according to a specific implementation. Firstly, after a user clicks on a portal of interactive experience, the entire live broadcast screen window can first be reduced to the upper left corner, and a page of loading transition appears. After loading of a real-time interactive content is completed, the live broadcast screen window can move diagonally from the upper left corner to the lower right corner, and the live broadcast screen shrinks during the movement. After that, the live broadcast screen can be reduced to the lower right corner by default. Apparently, the user can also drag the live broadcast window to a suitable position according to the degree of viewing comfort, etc.

Afterwards, the user can perform real-time interactive experience of three-dimensional product information in an interactive interface in combination with specific interactive operations while watching the live broadcast. After entering a real-time interaction space of 3D product information, the user can obtain interactive experience through an interactive content such as a specific 3D product object model while watching the live broadcast. The interactive content and the content described by the broadcaster are linked together in real time, thereby complementing each other, from which the he user can obtain more comprehensive and rich information.

A process of interaction in the above-mentioned interaction mode is described below using an example implementation. As shown in FIG. 3-3, if a product object associated with a current live broadcast is a certain mobile phone, an interactive content is then also related to the mobile phone, for example, a pre-provided three-dimensional model of the mobile phone, etc. After entering an interactive interface, 3D product information can be presented with an effect of 360-degree uniform rotation by default when no click is made by a user. After that, the user can freely rotate the three-dimensional model of the product object in 360 degrees through an interactive method such as touching the display screen, etc., with the guidance of a broadcaster in the live broadcast. A touch screen interaction gesture is as shown in the figure. For example, as a distance between the two ends touched by the fingers on the display screen decreases, the three-dimensional model can be shrunk. As the distance between the two ends touched by the fingers on the display screen increases, the three-dimensional model can be zoomed in. A presentation angle of the three-dimensional model can be changed in real time according to the different directions that a finger touches on the display screen. In addition, during the interaction process, the presentation angle of the three-dimensional model can also be changed in real time according to the different directions that the finger touches on the display screen, including the bottom and top of the product.

Figures 3, 4:
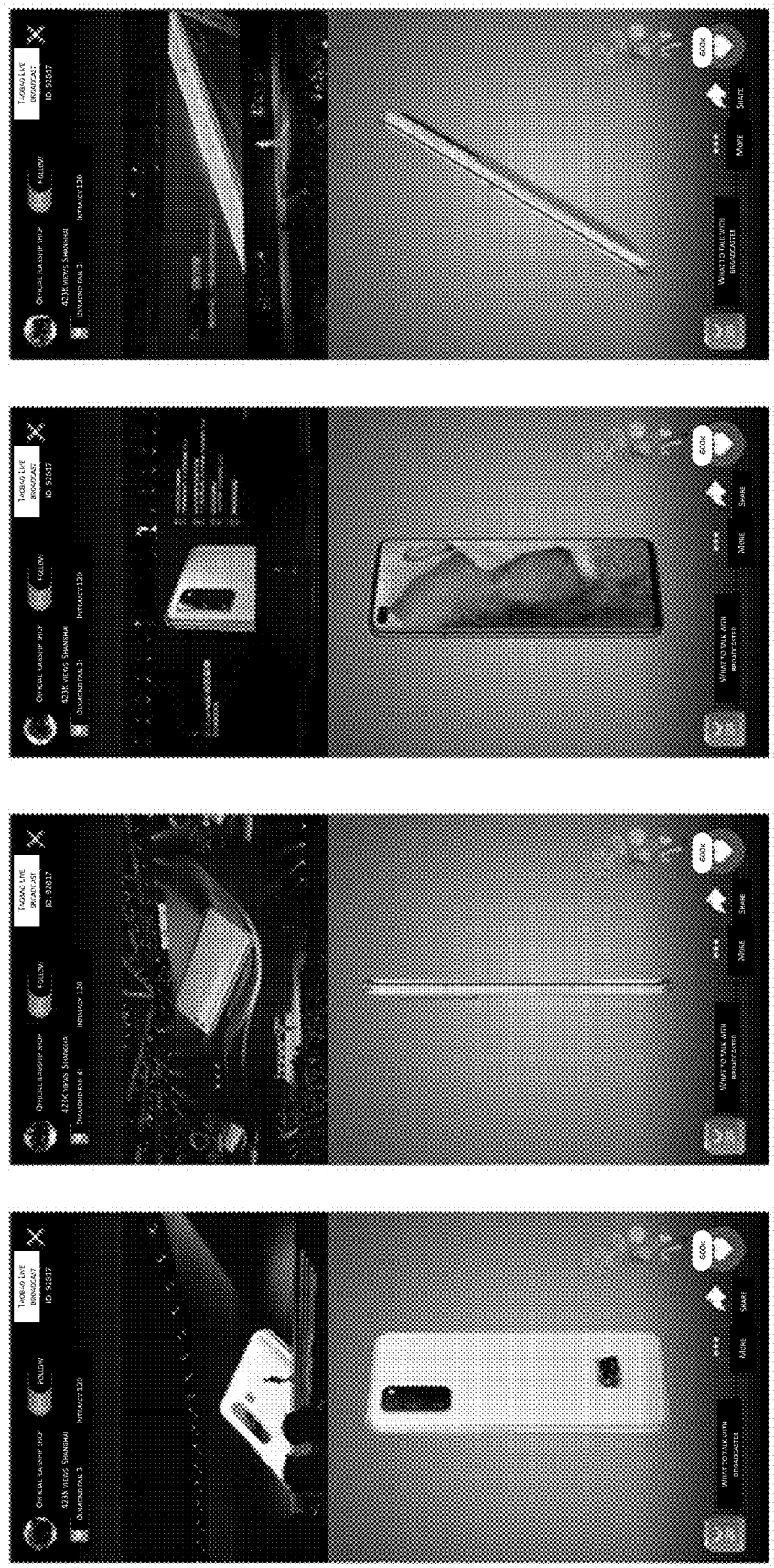

Another way to provide the interactive content may be to directly provide a first area and a second area in a video playing interface, wherein the first area is used to play the video content, and the second area is used to display the interactive content. In other words, in practical applications, especially for live broadcast content related to live broadcast of new product launches, there is usually a relatively large blank area in the live broadcast interface. For example, in a case of vertical screen display, the live broadcast content may only be displayed in the top half of the screen, etc. Therefore, in implementations, specific interactive content can also be provided directly in a specific area in the current video playing interface. In this way, in the live broadcast scenario, when the broadcaster in the live broadcast room describes the product, users watching the live broadcast can directly interact with the product information described in the live broadcast in real time on the current page of the live broadcast room. For example, as shown in FIG. 3-4, when the live broadcast describes the appearance of a mobile phone, a viewing user can see the three-dimensional model of the mobile phone currently narrated on the page of the live broadcast room, and the user can interact with the three-dimensional model of the mobile phone. The three-dimensional model can also display the effect of 360-degree uniform rotation by default when the user does not perform a click. During the interaction process, the user can freely rotate the three-dimensional product by touching the display screen according to the description and guidance of the broadcaster in the live broadcast, or, can achieve zooming the three-dimensional product in or out by a contraction gesture to change the distance between two ends touched by the fingers on the display screen, and so on.

Figures 3, 4, 5:
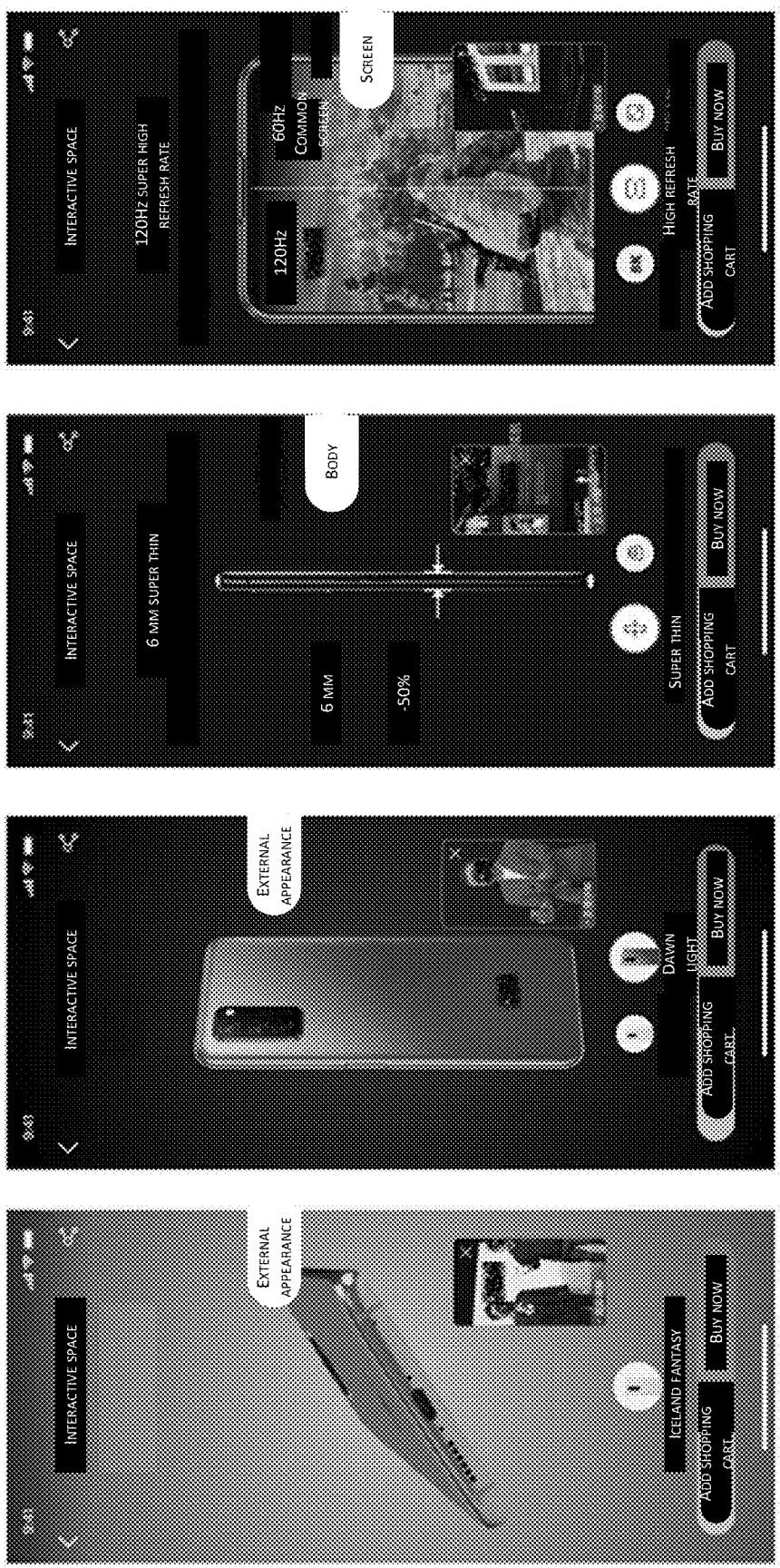

Whether it is the first way of providing the interactive content in an additionally created interactive interface or the second way of providing the interactive content directly in a specific area of a video playing interface, the interactive content and the live broadcast content can be changed synchronously. Specifically, when information of a product object in different dimensions is involved at different moments of a live broadcast content, an interactive content related to attribute information in a corresponding dimension can be provided. In other words, the content of real-time interactive experience of three-dimensional product information is kept synchronized with the rhythm of the live broadcast. For example, as shown in FIG. 3-5, according to the first method described above, the content described in the live broadcast can be kept in real-time synchronization with the three-dimensional product information that the user can experience: if the body color of "Icelandic Fantasy" is described in the live broadcast, what a user can participate in interactive experience is also the color of that product. After introducing the color of "Icelandic Fantasy" in the live broadcast and starting to talk about the second color of "Orange of Dawn", information corresponding to the product will be revealed in the interactive content. When specific body parameters are described in the live broadcast, the user can intuitively experience the relevant body parameters in the interactive content. If the mobile phone screen is mentioned in the live broadcast, the user can experience the detailed selling point features and related effects of the screen in the interactive content, and so on.

For another example, as shown in FIG. 3-6, according to the second method described above, it is also possible to maintain real-time synchronization between product content described in a live broadcast and three-dimensional product information content that a user can experience. For example, for a thickness parameter of the body of a mobile phone in a live broadcast, what a user can participate in interactive experience is also attribute information of the body parameter of such product object. If the mobile phone screen is mentioned in the live broadcast, the user can experience the detailed selling point features and related effects of the screen in the interactive content.

In addition, in addition to introducing attribute information of a same product object in different dimensions, live content may also involve a variety of different product objects. In response to this situation, when different product objects are involved in different moments of a live broadcast content, respective interactive contents related to corresponding product objects can also be provided. For example, as shown in FIG. 3-7, when a mobile phone is described in a live broadcast, an interactive content is also related to the mobile phone. When the live broadcast content is switched to describing a computer or watch, the interactive content that the user can participate in interactive experience also corresponds to computer-related content or watch-related content, etc.

There may be various ways to deliver an interactive content into a live broadcast session. For example, in one method, if a process of live broadcast is performed strictly according to a preset timeline, i.e., which aspect of the content will be introduced at a specific time point is set, a display order of specific interactive contents can be submitted to a server according to an arrangement of the process of live broadcast before the live broadcast starts. In this way, after the live broadcast starts, the server can directly provide interactive contents to clients of viewing users according to the information received in advance.

Alternatively, it is more likely that the process of live broadcast may not be performed strictly according to a pre-specified timeline. For example, an original plan is to introduce a color attribute for 5 minutes, and then introduce a screen attribute. However, since it is needed to conduct interactions with viewers, for example, during the actual live broadcast, the actual time duration for introducing the color is extended to 8 minutes, etc. In this case, if the display time of interactive content is predetermined, the interactive content may not be synchronized with the live broadcast content.

In view of the above situation, the embodiments of the present disclosure also provide an implementation solution for delivery of interactive content during a live broadcast process. Specifically, a live broadcast associated with a product object may specifically include a variety of situations, and a specific delivery scheme may also vary according to different situations. For example, as mentioned above, one situation may be a daily live broadcast initiated by a merchant or a seller who acts as a broadcaster. For example, a merchant initiates a live broadcast in a physical store thereof. In this case, the broadcaster can usually start a specific live broadcast event through a live broadcast function provided by a second client in a mobile terminal device such as a mobile phone. During the live broadcast, the live broadcast user introduces details of a specific product object, while collecting live images through the front camera, etc., of the terminal device. In this way, the live broadcast user can also interact with viewing users during the live broadcast, which includes answering questions raised by the viewing users. At the same time, the physical store is usually associated with an online virtual store, and a consumer can enter a live broadcast interface through a portal provided on the home page, etc., of the virtual store. In this case, an option of operation for interactive content delivery can be provided in the second client associated with the broadcaster, so that the broadcaster can determine whether to deliver an interactive content, when to deliver, and what kind of interactive content to deliver during the live broadcast, etc. The materials associated with specific delivery contents, etc. can be submitted to a server for storage in advance. When delivery is selected, an ID of a current live broadcast session, an identification of a delivered content, and other information are directly provided to the server, and the server can send specific delivery content to first clients watching the live broadcast, to allow the first clients to display the content.

Another situation may be a live broadcast of a launch site for new product objects. In this case, there may be a moderator at the launch site. However, in this case, the moderator may interact with audience, without watching the live broadcast directly. Instead, relatively professional cameras and other equipment will collect live broadcast signals and submit them to a server. Therefore, the moderator may not have time to perform operations such as delivery of interactive content, etc. In this case, a management client in the background can also be provided. The management client can provide an option of operation for delivering interactive content to a specific live broadcast, so that a management personnel can deliver specific interactive content to the live broadcast at some critical time points according to the progress of the live broadcast, etc. In this way, interactive contents associated with attributes of product objects in multiple dimensions can be gradually provided as the live content is played. The materials associated with specific interactive contents, for example, may also be submitted to the server for storage in advance.

It needs to be noted that since a live broadcast is usually performed in real time within a certain period of time and a client also usually provides a portal to playback content of the live broadcast, a user who has missed the live broadcast can also watch the content of the live broadcast by means of playback. In this case, the embodiments of the present disclosure can also provide interactive content in this type of process of playing a replayed live content, so that a user can obtain more detailed information about a product object through the interactive content when viewing the replayed live content. Since it has already been known which specific interactive contents are delivered at which time points for a playback scenario, multiple interactive themes involved in the interactive contents can also be displayed during a playback process. In this way, after a target interactive theme is selected, the progress of playback can also be jumped to a time point corresponding to the target interactive theme in the live broadcast content for playing. In other words, a user may only be interested in some of the interactive themes. As such, in the playback state, specific interactive themes can be used as anchor points, so that the user can click on a specific interactive theme during the playback process to make the progress of playback directly jump to a time point corresponding to the interactive theme for playback, etc. For example, a certain live broadcast is an introduction to a mobile phone, and interactive themes therein include appearance, screen parameters, camera performance, etc. If a user is interested in the camera performance, but does not care about the appearance and screen parameters, the user can directly click on a theme of "Camera Performance" to skip contents describing information such as the appearance and screen parameters, etc., in a replayed live video content, directly jump to a moment when information on the "Camera Performance" dimension is described, and start playing from that moment. The user can perform specific interactive operations during the playback process, and so on.

Materials associated with various interactive contents of a product object may be pre-made by a merchant or seller, etc. and submitted to a server for storage. Alternatively, a physical object of the product object may also be provided to a backend staff of the server, and the backend staff is responsible for production and submission of the materials. When storing the information, the server can save the information in units of product objects. For example, correspondence relationships between product object IDs and various types of materials can be stored. Alternatively, multiple interactive themes may also be provided for a same product object (for example, which may be related to dimensions of specific displayed information, including appearance, performance, parameters, etc.), and each interactive theme may correspond to a material set. Specifically, the information stored by the server can be as shown in Table 1 below:

TABLE 1

| Product Object ID | Interactive Theme | Material |
| --- | --- | --- |
| 100001 | Appearance | Material Set 1 |
| | Space | Material Set 2 |
| | Freshness-Keeping | Material Set 3 |
| | Installation | Material Set 4 |
| | Control | Material Set 5 |
| . . . | . . . | . . . |

When a broadcaster or administrator needs to deliver an interactive content to a live broadcast session, he/she can initiate a delivery request through a relevant option of operation, enter a specific live broadcast ID and an associated product object ID in a relevant request interface, and select specific interactive theme(s). After submitting the delivery request to a server, the server can determine corresponding materials and provide the materials to first client(s) corresponding to viewing user(s) for displaying the interactive content. For example, a management client is taken as an example. A specific request interface can be shown in FIG. 4. An administrator can select specific product objects, interactive themes, etc. that need to be interacted according to an actual progress of a target live broadcast session, and submit a delivery request to a server. After an interactive content is delivered to the specific live broadcast session, an interactive portal can be displayed on a live broadcast interface of a first client, and an associated user can open a specific interactive interface (an independent interactive interface or an interactive area within the live broadcast interface) through the portal.

It needs to be noted that, in addition to a three-dimensional model of a product object, two-dimensional information (such as picture, video, audio, text, etc.) related to the product object can also interact with users in real time in a live broadcast room. For example, when talking about selling points of a phone's body parameters, photography, video capture, charging and other functions in a live broadcast, a user can interact with information of these selling points in the live broadcast room by touching and clicking the screen, dragging, etc., to learn various types of information of the product comprehensively.

S202: Provide a change process of the interactive content according to the material in a process of responding to interactive operation information inputted by a user, to enable presentation of various attributes of the product object.

When the interactive content is provided, the user can input a specific interactive operation, and correspondingly, the client can provide a change process of interactive content according to the specific material, to enable presentation of various attributes of the product object.

There may be various kinds of specific materials, which are respectively used to display various attributes of the product object, and correspondingly, processes of changing a displayed content during an interaction process may also be different. For example, the material associated with the product object includes: an image material used to display the appearance of the product object in multiple perspectives or sizes. At this time, in the process of responding to the interactive operation information inputted by the user, a change process of the appearance of the product object in multiple perspectives or sizes can be provided. For example, as shown in FIG. 3-3, for a product object such as a mobile phone, during an interaction process, operations such as zooming, rotating a three-dimensional model can be performed through a touch screen operation, etc., so that rich information about the product object under multiple perspectives or sizes can be obtained.

Alternatively, the material associated with the product object may include: an image material used to display the product object in various states ranging from appearance to internal structure or details. At this time, in the process of responding to the interactive operation information inputted by the user, a change process of the product object from the appearance to the internal structure or details of various states is provided. For example, if a product object is a hair curling iron, the user may not only need to care about its appearance, but also its internal structure. As such, the user can also be provided with a state change process of the product object from the appearance to the internal structure through interactive contents, for example.

Alternatively, the material associated with the product object may include: an image material used to display installation and control processes and/or use effects of the product object in a usage state. At this time, in the process of responding to the interactive operation information inputted by the user, change processes of the installation and control processes and/or the use effects of the product object in the usage state are provided according to the material.

Alternatively, the material associated with the product object may further include: an image material for displaying a change process of a performance attribute of the product object. At this time, in the process of responding to the interactive operation information inputted by the user, a change process of the performance attribute of the product object is provided according to the material.

It needs to be noted that, in implementations, the interactive operation information inputted by the user includes: interactive operation information used to simulate a specified action performed by a person on a physical object of the product object (for example, simulating operations such as opening a refrigerator's door, sliding, flipping, etc., performed by a person), or interactive operation information used to instruct the product object to perform a specified action (for example, instructing a refrigerator to pour out ice cubes, or instructing a sweeping robot to start sweeping, etc.).

Regarding the specific interaction method, i.e., the way in which the user inputs the interactive operation information, various ways may exist, which include an input through a touch screen, or a voice input, etc. In a preferred embodiment of the present disclosure, a same product object may correspond to a variety of different interactive themes, and different interactive themes may require different types of materials to generate corresponding interactive contents. A type of the material may include a three-dimensional model, a two-dimensional picture, video, audio, text, and the like. If interactive operation information for interactive contents generated by different types of materials is all inputted through a same interactive channel, this may appear to be dull, and may not reflect the advantages of each type of material. For example, for materials about three-dimensional models, an advantage thereof is to provide a user with more realistic and three-dimensional visualization information, so that the user can obtain an experience closer to an offline experience. However, if the user can only input interactive operation information through a touch screen interaction, this may affect the user to obtain the above experience.

Therefore, for an interaction scenario in which multiple types of materials coexist, the embodiments of the present disclosure can also provide users with multiple interactive channels at the same time, to facilitate an input of the interactive operation information through one of the interactive channels. Different interactive channels correspond to different input methods of interactive operation information. Specifically, the interactive channels may include a voice channel, a touch screen channel, etc., so that a user can input specific interactive operation information through a voice input, or by performing operations such as clicking and sliding on the touch screen.

In addition to the commonly seen voice channel and touch screen channel, the embodiments of the present disclosure can also provide a new interactive channel for users, that is, a channel for performing an interactive operation input by means of air gestures. At this time, a control instruction may be generated by recognizing a gesture category of an air gesture, so as to control a change process of interactive content. The so-called air gesture is a technology that allows a user to control or interact with a device using a simple gesture without touching the device. Its core technology includes gesture segmentation, gesture analysis and gesture recognition. The most critical aspects of gesture recognition include tracking of an air gesture and subsequent computer data processing. Capturing an air gesture can mainly be achieved through sensors and optical cameras.

In implementations, gestures and corresponding interaction instructions can be defined in advance. In this way, after a user makes a specific air gesture, a corresponding interaction instruction can be determined according to the definition, and a specific interactive content can be controlled to make a corresponding change. For example, a gesture associated with thumb and index fingers from closing to opening can control a dynamic change process of unfolding the appearance to internal details of a three-dimensional product. Specifically, a product object such as a hair straightener is used as an example. As shown in FIG. 5-1, when no user interaction is received, an initial state when the hair straightener is turned off can be displayed. At this point, an option of operation to start interaction, for example, words "click to start gesture interaction" may be displayed, etc., may be provided. Afterwards, a user can perform a specific air gesture. For example, as the gesture of thumb and index fingers changes from closed to open, the three-dimensional model gradually opens, showing a change process of the splints on both sides of the hair straightener gradually opening. In this process, the details of each component inside the three-dimensional product can be fully expanded.

Alternatively, a rotation operation can also be performed on the three-dimensional model of the product object through an air gesture. For example, an air gesture of this operation can be specifically defined as an angle change of the index finger. At this time, as shown in FIG. 5-2, the three-dimensional model can be at the front view angle in the initial state. Afterwards, as the angle of the index finger of the gesture changes, the angle of the three-dimensional model can present the same angle of rotation. For example, as the hair straightener follows the index finger and swings 30 degrees to the right, the entire curling iron rotates 30 degrees to the right. As the angle of the index finger of the gesture changes, three-dimensional products at different angles can be viewed three-dimensionally. For example, it can be rotated 90 degrees to the left and then 45 degrees inward with the index finger, and the angle of view of the hair straightener can also be changed by rotating 90 degrees to the left and then 45 degrees forward, and so on.

Alternatively, an air gesture can also be used to demonstrate a functionality of a product object. A specific way of defining an air gesture may be related to characteristics of an operation of a process of demonstrating a function of a specific product object. For example, the specific product object is a hair straightener. When performing a demonstration of a function, it is necessary to hold the hair straightener, clamp the root of the hair, and move the straightener downward in parallel. Correspondingly, the hair will have a process of change from curly to straight. In view of this situation, a corresponding air gesture can be defined as: clenching a first and moving from top to bottom. Correspondingly, a gesture interaction at the product function level is formed in conjunction with corresponding rendering of the product. For example, as shown in FIG. 5-3, in the initial state before the demonstration of a function, the hair straightener is at the top of the screen, and the hair shows the initial effect without being processed by the straightener. As the first clenching gesture moves from the top to the bottom of the screen, the position of the product also moves from top to bottom, and the state of the effected object also changes accordingly. As shown in the figure, the hair straightener moves downward from the top position of the screen according to the movement of the first clenching gesture, and the hair passes through the parts covered by the hair straightener, resulting in corresponding changes in the hair straightening effect. When moving to the bottom, the overall functional interaction is completed, the hair straightener moves to the bottom of the screen according to the first clenching gesture, wherein the hair passes through the parts covered by the hair straightener, and the hair changes from initial curly hair to straight hair.

In addition, in implementations, according to a received air gesture, a graphic element corresponding to the air gesture may also be added to an interactive interface. For example, if the product object is a refrigerator and the air gesture performs an operation of opening the refrigerator's door, a graphic element of "human hand" can be added to the position of the refrigerator's door in the interactive interface, and a process of the "human hand" opens the refrigerator's door, etc., is displayed. Furthermore, since the user needs to specify a predefined air gesture, a specific interaction purpose can be achieved. Otherwise, if the air gesture input by the user is an undefined gesture in the system, or a gesture that is not standardized enough, the system may not recognize it, and no interactive effect is obtained. Therefore, by displaying graphic element(s) in the interactive interface, it is also possible to prompt execution mode(s) of air gesture (s) and corresponding control effect(s), so that the user can execute a specific air gesture according to prompt information, thereby improving the efficiency of interaction.

Through this type of interaction method of air gestures, a user can realize interaction in a novel way without touching the screen, and it is also more beneficial for the user to obtain an experience similar to an actual offline operation. It needs to be noted that, in implementations, types of air gestures that are used may be different for different product objects, different interactive themes, etc. Therefore, a hint about how to enter an air gesture may be provided in the interactive interface to guide a user to make a correct air gesture.

When multiple interactive channel functions are provided, multiple ways of selecting an interactive channel can be provided to a user. For example, in one method, an option of operation for selecting an interactive channel may be provided, to facilitate inputting the interactive operation information through a selected interactive channel. Specifically, referring to FIG. 6-1, a variety of selectable interactive channels, including gesture interaction, voice interaction, and touch screen clicking, etc., may be provided at a position indicated by 61 in the interactive interface. The user can select one of the interactive channels to input an interactive operation. For example, in FIG. 6-1, "Gesture Interaction" is selected, and the user can input specific interactive operation information by means of an air gesture.

Figures 3, 4, 5, 6:

For another example, as shown in FIG. 6-2, if voice interaction is selected, an option of operation such as "microphone" may also be provided. The user can press and hold this option for voice input. For example, if the voice input is "zoom in refrigerator", the system recognizes the voice command issued by the user, translates the voice content into text information, and can also directly display the specific text command content on the interface. For example, the text information of "zoom in refrigerator" is directly displayed on the interface. At the same time, the system understands the intent of the user's instruction based on semantic understanding and forms the instruction for execution, performs the execution according to the instruction, and generates the original text content in reply. The content of the reply can be directly displayed to the user on the interface, and the text generated by the system can be translated into audio by means of speech synthesis, which is outputted and fed back to the user through the smartphone and executes a specific instruction feedback. For example, the system replies "OK, master" according to the user's instruction of "zoom in refrigerator", and feeds back this text to the user in a form of text and audio. At the same time, the feedback effect that the three-dimensional model of the refrigerator on the page is zoomed in is realized.

For another example, as shown in FIG. 6-3, if the touch screen clicking is selected, the user can input specific interactive operation information by performing an operation such as clicking and sliding on the touch screen. Specifically, for example, the user can view a change process of food preservation effects at different times interactively by dragging a button left and right, or check the storage capacity of the refrigerator interactively by tapping the screen, or zooming the viewed content of product information in or out through an interactive mode of multi-touch screen manipulation, or switch between multiple product pictures for browsing by sliding left and right, up and down on the screen, and so on.

Figures 3, 4, 5, 6, 7:
Figure 4:
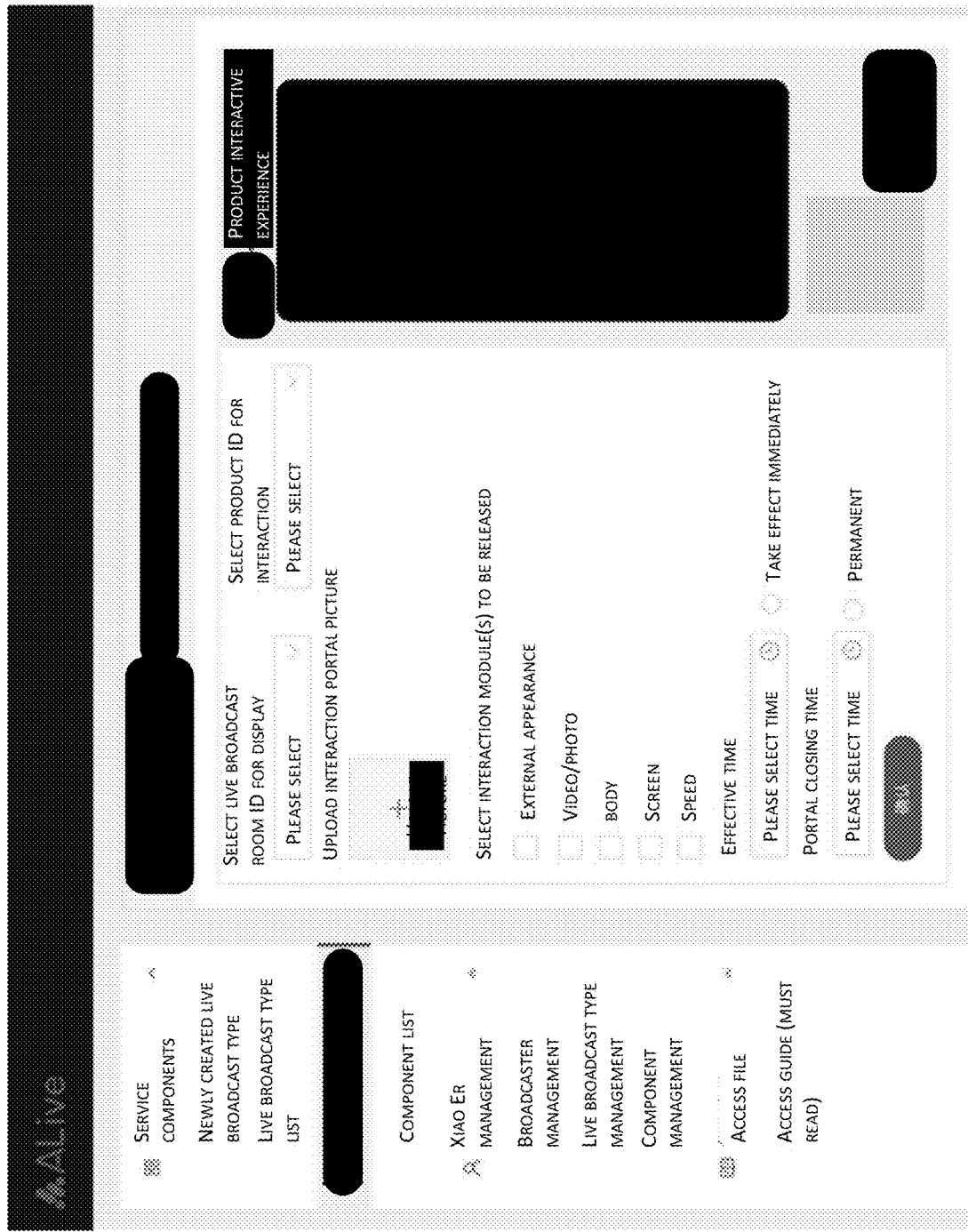
Figures 1, 5:
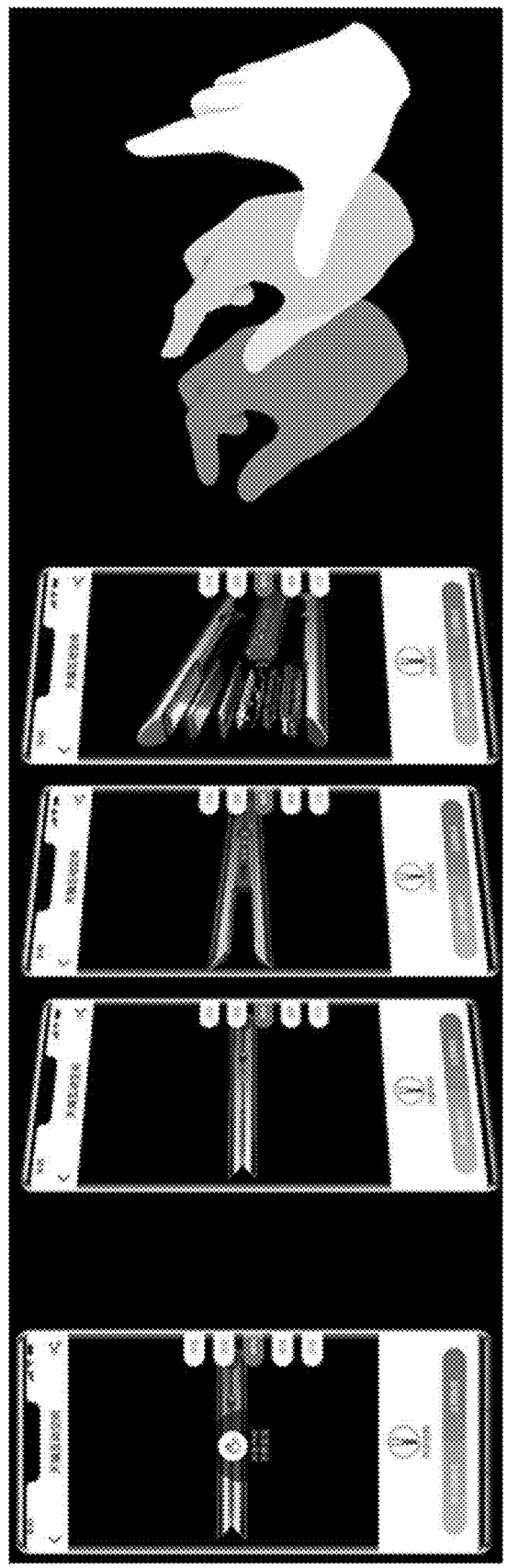
Figures 2, 5:
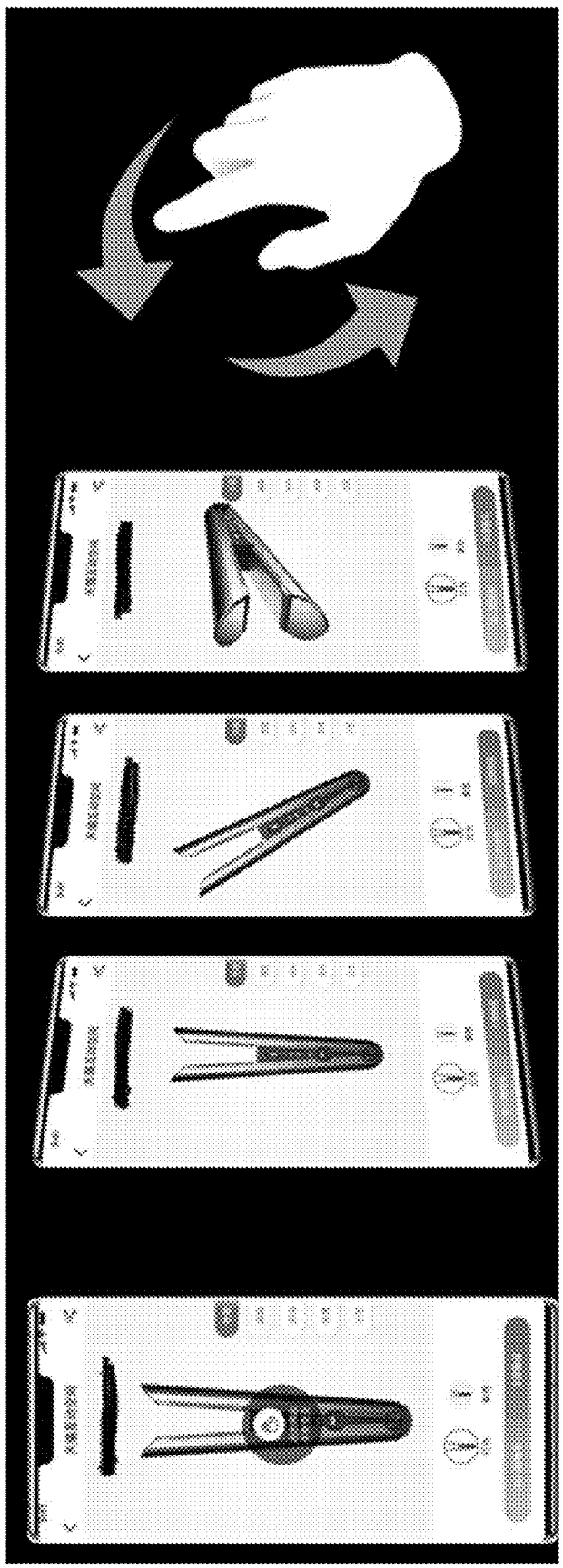
Figures 3, 5:
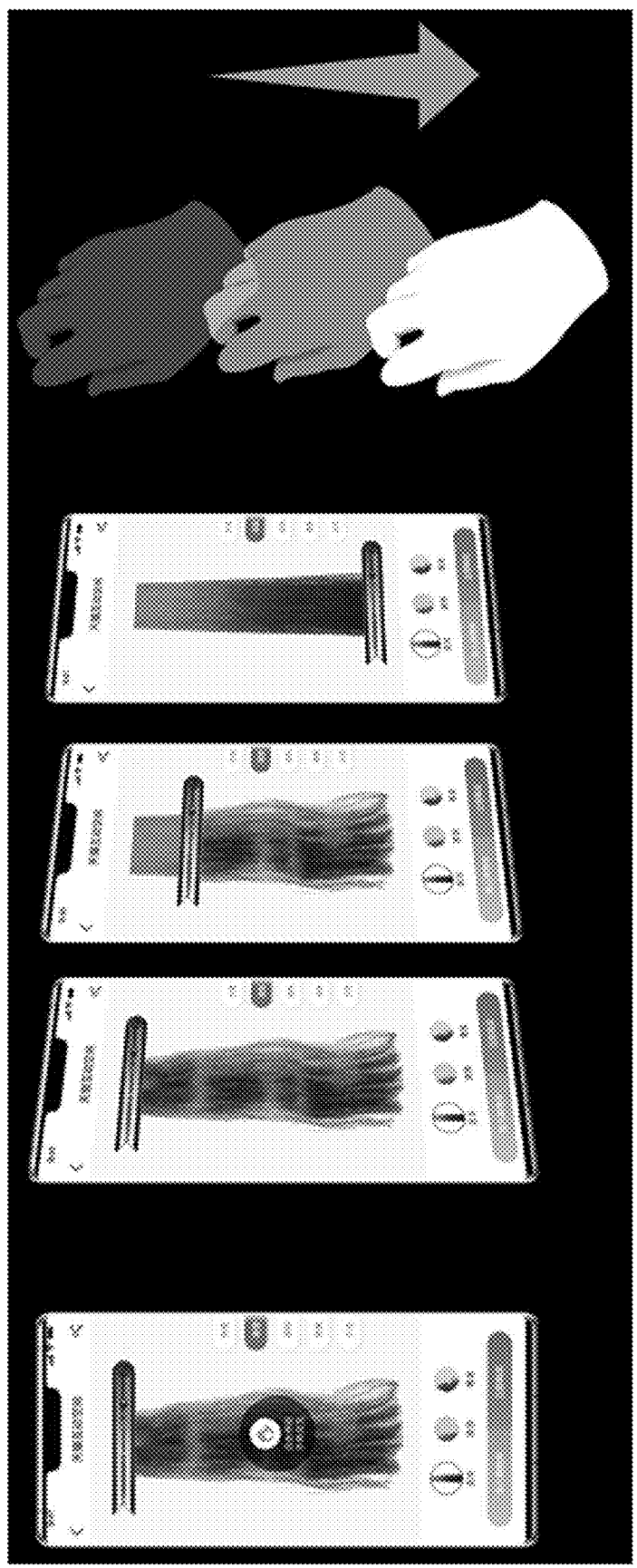
Figures 1, 6:
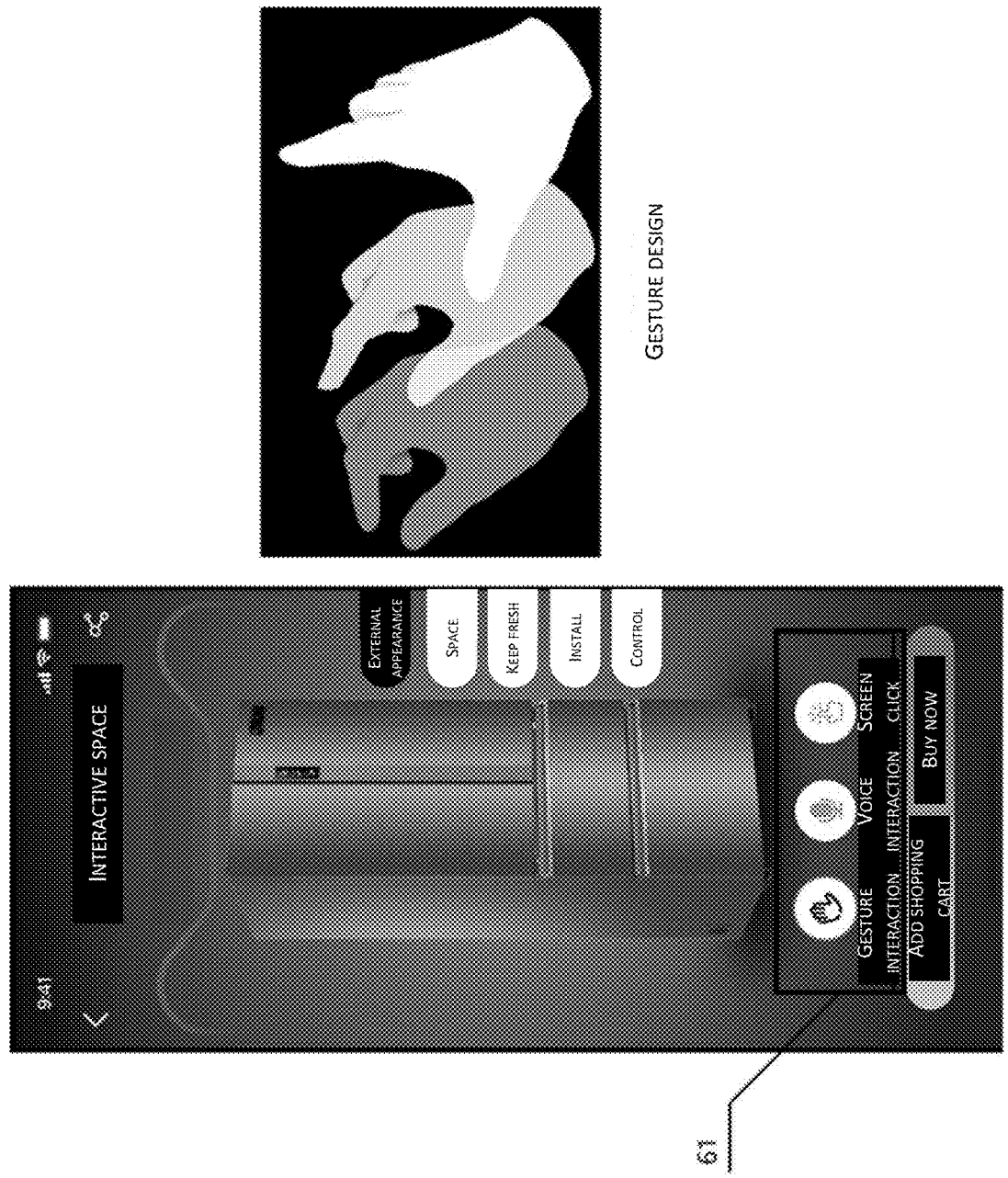
Figures 2, 6:
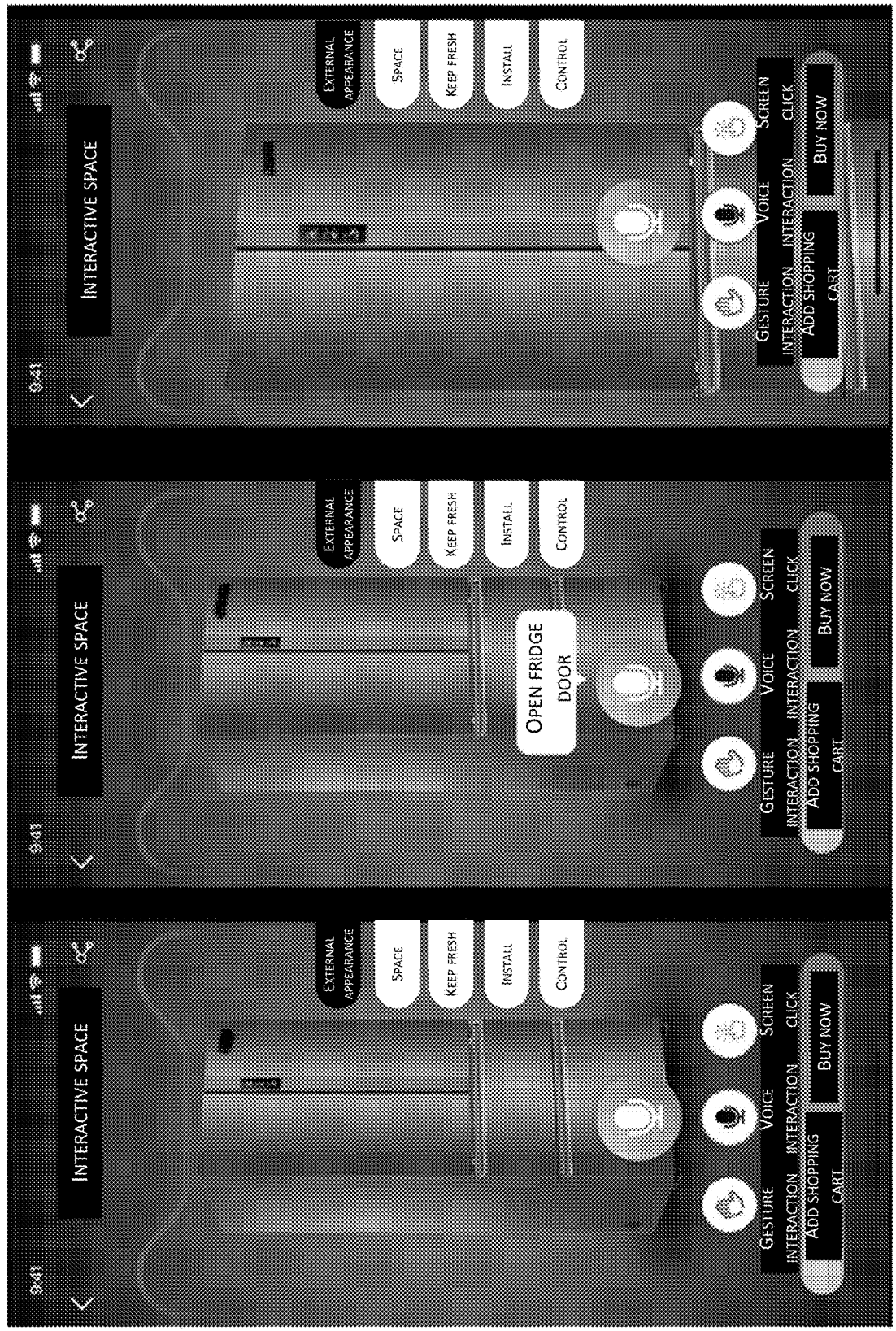
Figures 3, 6:
Figures 1, 7:
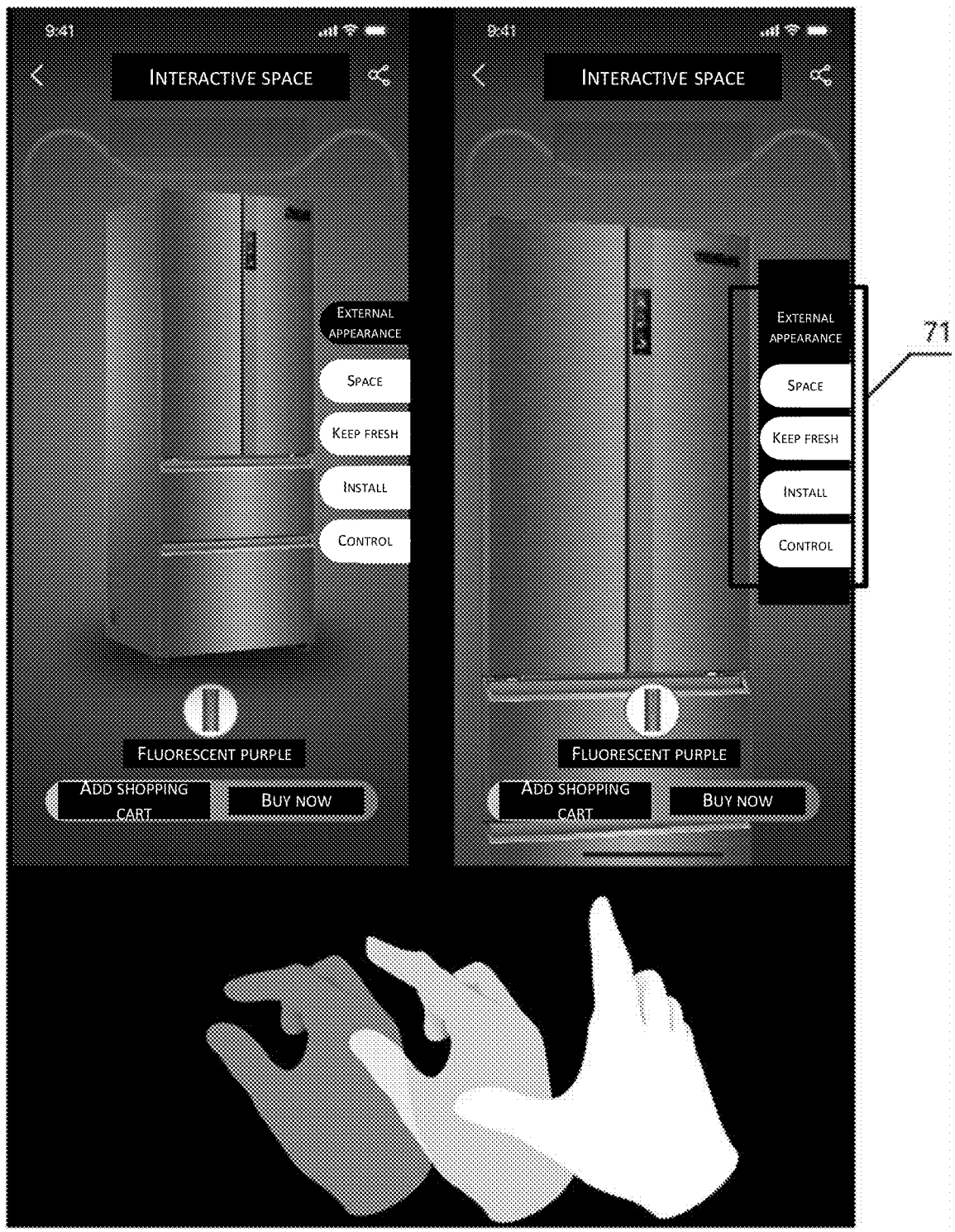
Figures 2, 7:
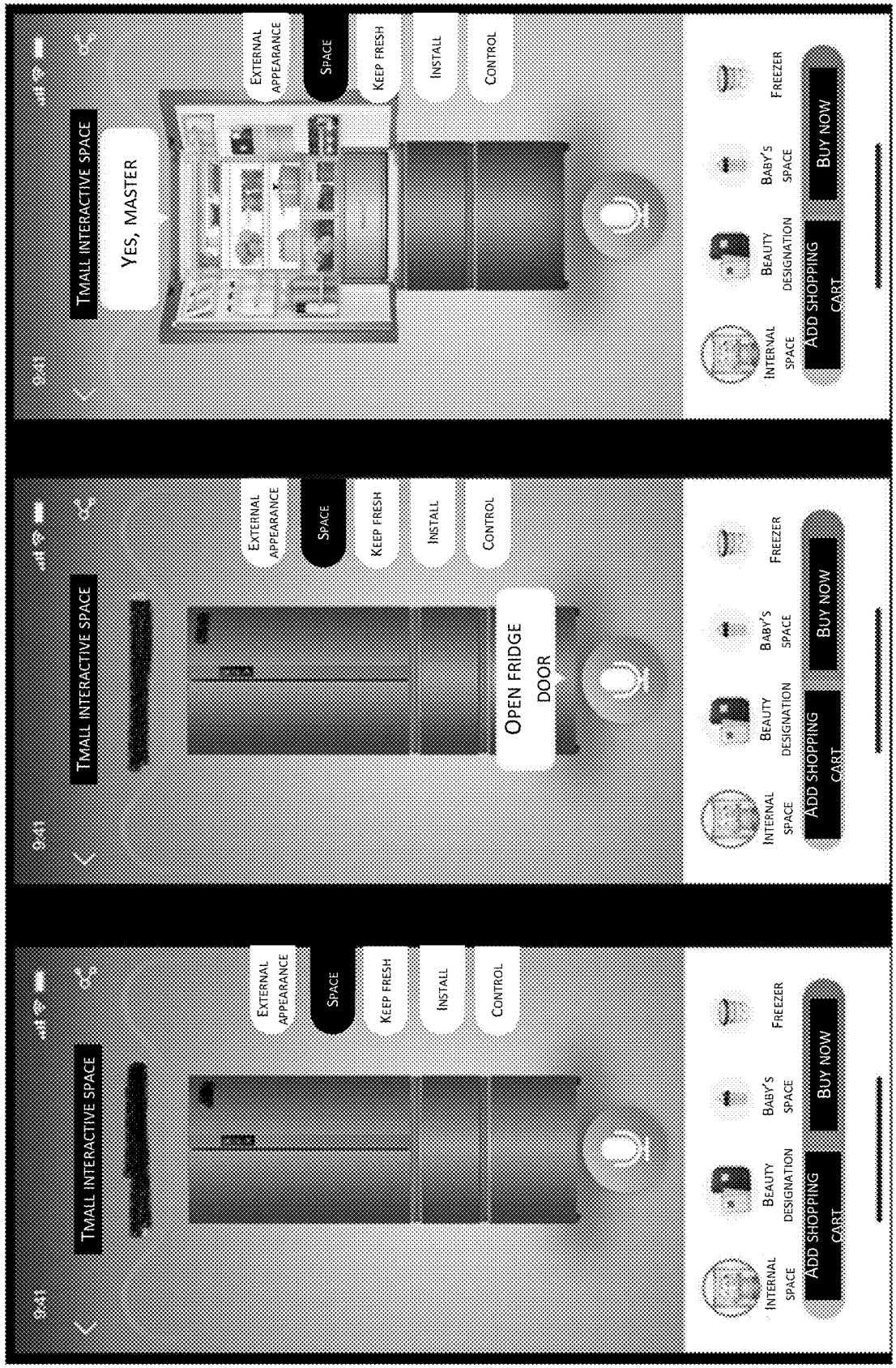
Figures 3, 7:
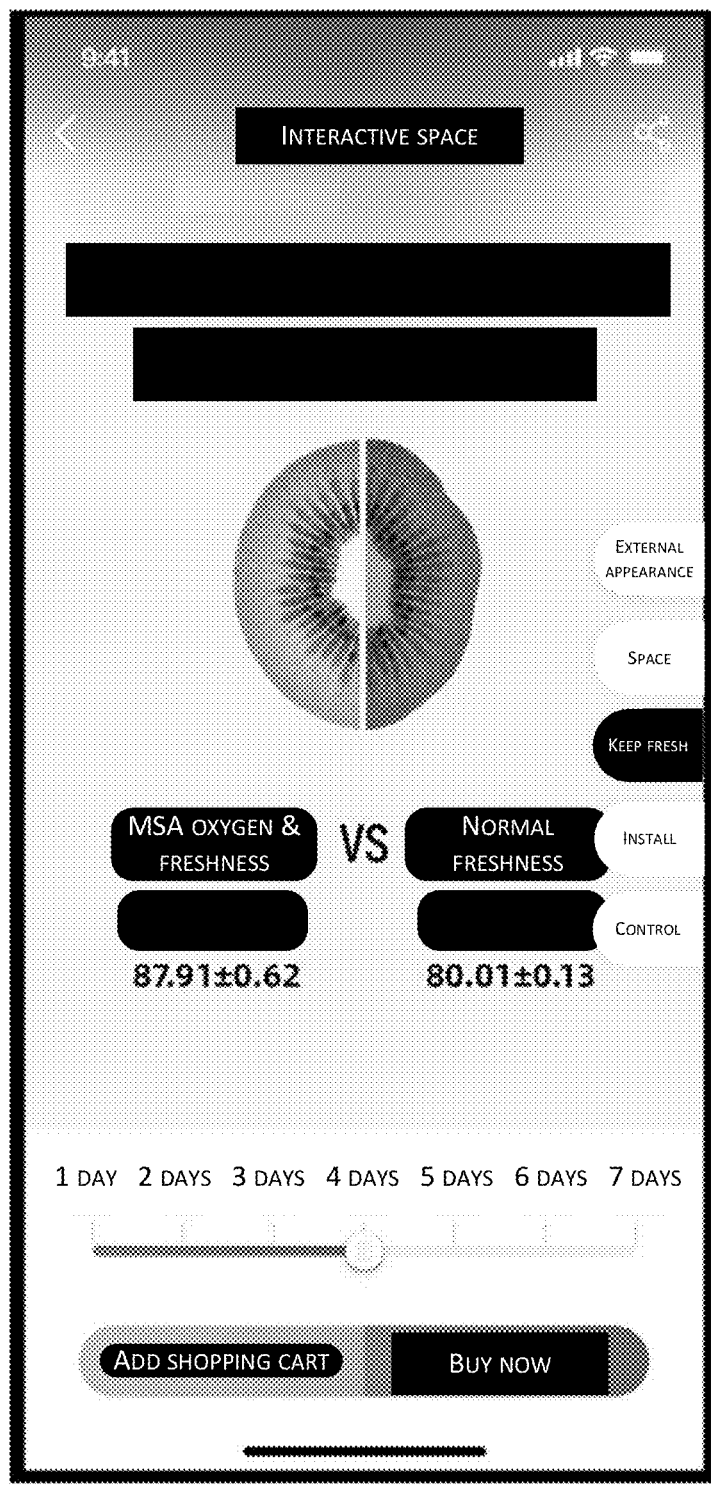

In another way, a same product object can usually correspond to a variety of different interactive themes. For example, for a product object such as a refrigerator, corresponding interactive themes can include appearance, space, freshness-keeping, installation, touch, and so on. Each interactive theme may correspond to attribute information of a product object in one dimension, and may correspond to a material set specifically used to describe the attribute information in the corresponding dimension. Since different interactive themes may correspond to different types of materials and ways of changing interactive contents in an interaction process may also be different, interactive channels suitable therefor may also be different. For example, for an interactive theme of appearance, it is more suitable to use a gesture interactive channel, and for a theme of "space", it is more suitable to use a voice input because it is inconvenient to describe your needs in a form of air gestures. Regarding a theme of "freshness-keeping", it may be more suitable to input through a touch screen, and so on. In short, a suitable interactive channel can be determined in advance according to the characteristics of materials associated with various interactive themes. Correspondence relationships between specific interactive themes and interactive channels can be stored in the server in advance. Information of such correspondence relationships may be provided to a first client. In this way, multiple tabs can be provided in an interactive interface, and each tab corresponds to a variety of different interactive themes, which are used to switch and display interactive contents corresponding to different interactive themes. After one of the tabs is selected, interactive operation information can be received through a target interactive channel associated with an interactive theme corresponding to that tab. In other words, as shown in FIG. 7-1, for a product object such as a refrigerator, tabs are indicated by 71. If a user selects an "Appearance" tab, a gesture interactive channel can be enabled by default, and the user can input interactive operation information through an air gesture. As shown in FIG. 7-2, if the user needs to interact with a theme "Space" during an interaction process, a voice interactive channel can be automatically opened to provide an option of voice input in a style of "microphone", etc., after switching to this tab. The user can press and hold this option for voice input, such as "open the refrigerator's door", and the refrigerator in the interactive content will show a process of opening the refrigerator's door. For another example, as shown in FIG. 7-3, after a "Freshness-Keeping" tab is selected, a touch screen interactive channel can be enabled by default, and the user can input a specific interactive operation by clicking and sliding on the touch screen to input interactive operation information, etc.

By providing multi-channel interactive operations, the actual interaction effect can be almost the same as the experience obtained when the user directly faces the physical object of the product, so that the user can understand the information of the product at a deeper level. At the same time, the embodiments of the present disclosure realize the integration of multi-channel interaction. Users can freely and dynamically recognize product information from various perspectives, so that they can understand the shape and function of each part of the product, and even enable them to generate interactive behaviors for the product through voice input or gesture operations, so that consumers can more accurately understand the characteristics and usage of the product, and make shopping decisions confidently. In addition, this multi-interactive channel solution also satisfies experience demands of consumers that they can perceive multi-dimensional product information in a variety of interactive ways, and the entire process of experience is vivid, natural and interesting. Based on the multi-channel interaction technology, the interactive designs and applications of multi-dimensional information of products may greatly improve consumers' experience of purchasing products on Internet platforms, and significantly improve the usability, feasibility and competitiveness of the Internet platforms.

It needs to be noted that, in implementations, interactive contents provided during a playback of a video content may include a variety of interactive themes. For example, for a refrigerator, interactive themes may include appearance, space, freshness-keeping, installation, manipulation, etc. In an optional implementation, during an interaction process, options of operation for expressing approvals or likes (for example, a like button, etc.) may be respectively provided for different interactive themes, so as to conduct statistics about the users' approvals or likes in units of interactive themes. In other words, in the embodiments of the present disclosure, the users' degree of like for information in different dimensions of a same product object can be counted separately, and thereby a determination can be made about which dimension(s) can be main selling points, and so on.

In short, through the embodiments of the present disclosure, an interactive content can be provided in a process of introducing product object information through a video content. The material associated with the product object is generated, and this material is used to describe specific attributes of the product object, which may specifically include a three-dimensional model, pictures, videos, etc. of the product object. In this way, when watching a video of the product object, a user can also interact with a specific interactive content. During an interaction process, the user can input a specific interactive operation. Correspondingly, the interactive content can follow the interactive operation to send a corresponding change in order to present attribute information of the product object in various dimensions and states. In this way, the video content and the interactive content of the product object complement each other, providing the user with more comprehensive and richer details of the product object, thereby helping the user to make a shopping decision in a better way.

In an optional implementation, a variety of specific interactive channels can also be provided for a user, so that the user can input specific interactive operation information in various ways, including voice interaction, touch screen interaction, and the like. A specific interactive channel is customized for a specific interactive theme, and the basis of customization can be the characteristics of a material associated with the interactive theme in a display process. In this way, a more suitable interactive channel can be selected for the specific interactive theme, which helps the user to input an interactive operation, while enabling users to obtain an experience that is closer to the actual offline experience of a product object.

The user can also be provided with an interactive channel for air gestures, so that the user can input specific interactive operation information through an air gesture. In this way, the user does not need to touch the screen of a specific terminal device during the interaction process. In addition, specific air gestures can be designed according to operation modes in actual operations corresponding to the physical object of the product object, so that the user can obtain an experience that is closer to offline operations of the physical object during the interaction process.

Second Embodiment

Figure 8:
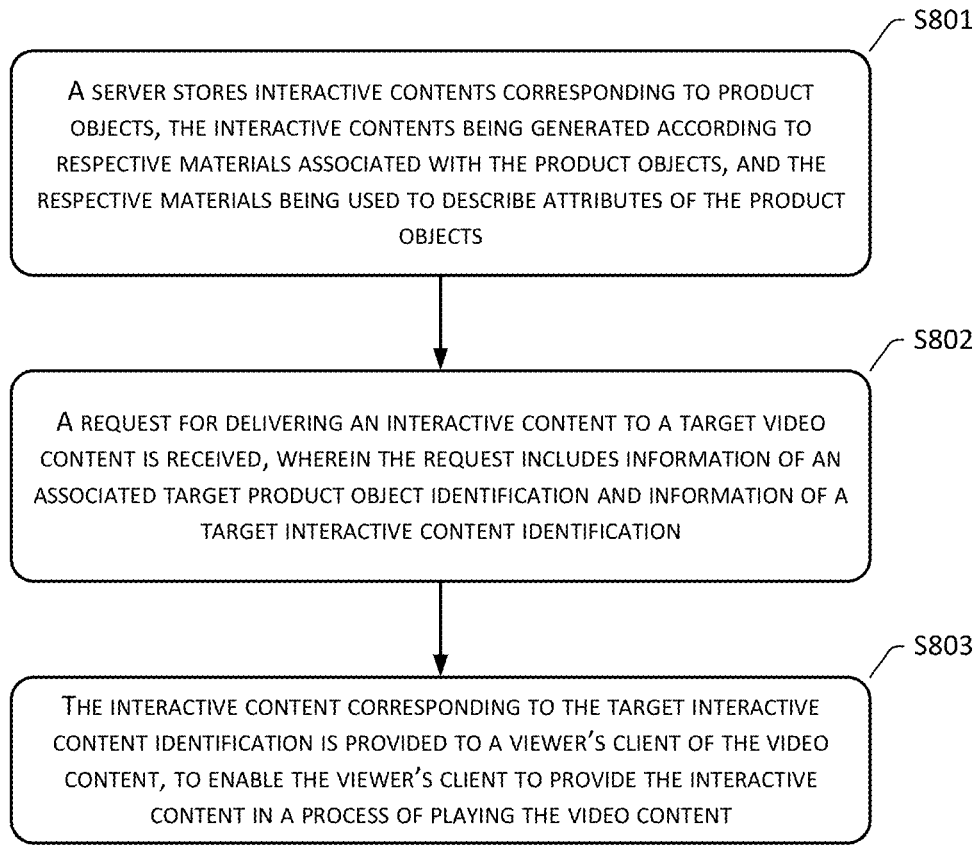
FIG. 8 is a flowchart of a second method provided by the embodiments of the present disclosure.

The second embodiment corresponds to the first embodiment. From the perspective of the server, a method for providing product object information is provided. Referring to FIG. 8, the method may specifically include:

S801: A server stores interactive contents corresponding to product objects, the interactive contents being generated according to respective materials associated with the product objects, and the respective materials being used to describe attributes of the product objects.

S802: A request for delivering an interactive content to a target video content is received, wherein the request includes information of an associated target product object identification and information of a target interactive content identification.

S803: The interactive content corresponding to the target interactive content identification is provided to a viewer's client of the video content, to enable the viewer's client to provide the interactive content in a process of playing the video content, and a change process of the interactive content is provided according to the material in a process of responding to interactive operation information inputted by a user.

In implementations, the video content may include a live broadcast content.

The live broadcast content includes a live broadcast content of a launch site of a new product object. At this time, a request submitted by a management client to deliver an interactive content to a target live broadcast session may be specifically received.

Alternatively, the live broadcast content includes a live broadcast content used to introduce a published product object. At this time, a request submitted by a client of a broadcaster of the live broadcast content to deliver an interactive content to a target live broadcast session may be received.

Third Embodiment

Figure 9:
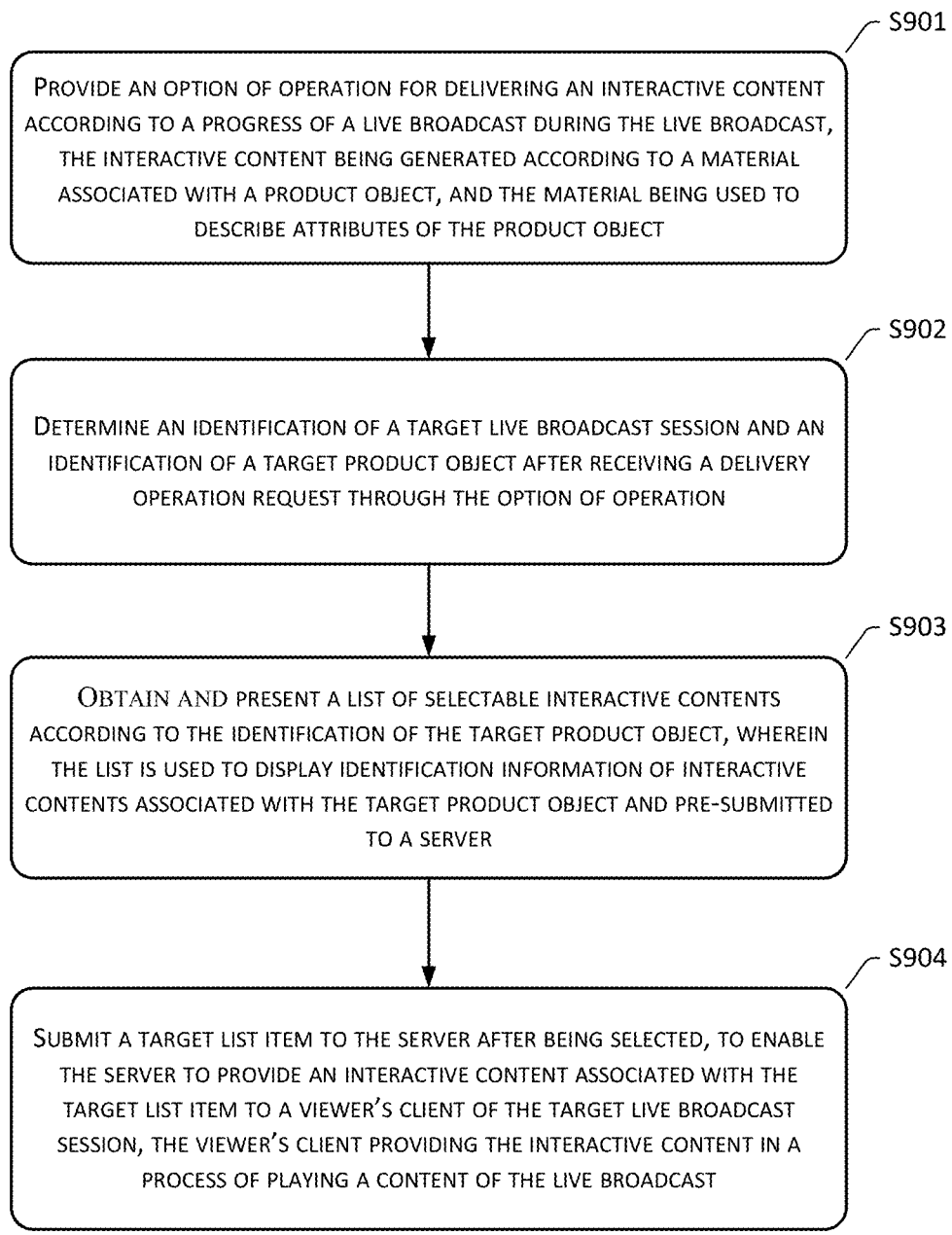
FIG. 9 is a flowchart of a third method provided by the embodiments of the present disclosure.

The third embodiment also corresponds to the first embodiment. From the perspective of the management client as shown in FIG. 1, a method for providing product object information is provided. Referring to FIG. 9, the method may specifically include:

S901: Provide an option of operation for delivering an interactive content according to a progress of a live broadcast during the live broadcast, the interactive content being generated according to a material associated with a product object, and the material being used to describe attributes of the product object.

S902: Determine an identification of a target live broadcast session and an identification of a target product object after receiving a delivery operation request through the option of operation.

S903: Obtain and present a list of selectable interactive contents according to the identification of the target product object, wherein the list is used to display identification information of interactive contents associated with the target product object and pre-submitted to a server.

S904: Submit a target list item to the server after being selected, to enable the server to provide an interactive content associated with the target list item to a viewer's client of the target live broadcast session, the viewer's client providing the interactive content in a process of playing a content of the live broadcast, and provide a change process of the interactive content according to the material in a process of responding to interactive operation information inputted by a user.

Fourth Embodiment

Figure 10:
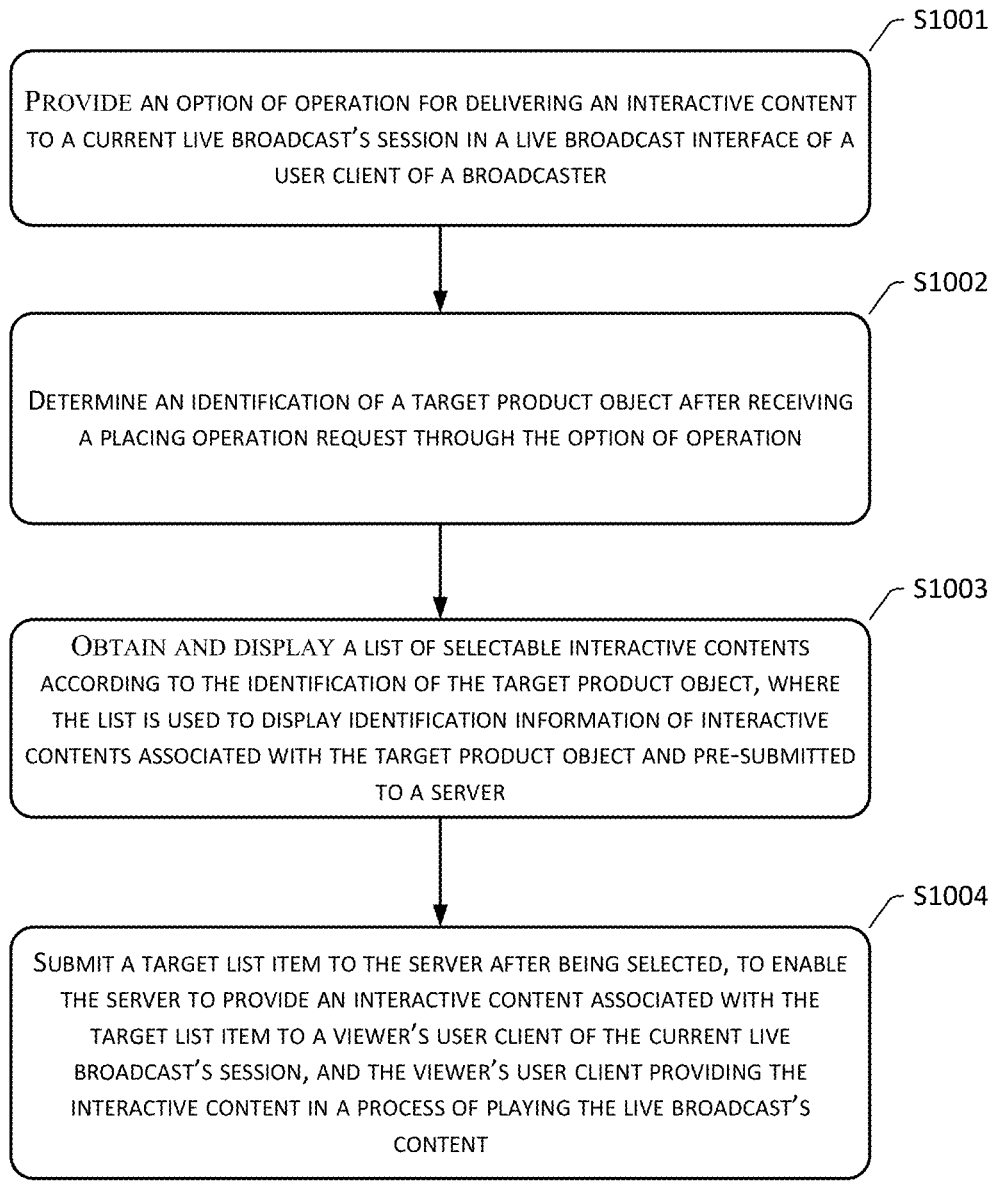
FIG. 10 is a flowchart of a fourth method provided by the embodiments of the present disclosure.

The fourth embodiment also corresponds to the first embodiment. From the perspective of the second client associated with the broadcaster shown in FIG. 1, a method for providing product object information is provided. Referring to FIG. 10, the method may specifically include:

S1001: Provide an option of operation for delivering an interactive content to a current live broadcast's session in a live broadcast interface of a user client of a broadcaster.

S1002: Determine an identification of a target product object after receiving a placing operation request through the option of operation.

S1003: Obtain and display a list of selectable interactive contents according to the identification of the target product object, where the list is used to display identification information of interactive contents associated with the target product object and pre-submitted to a server.

S1004: Submit a target list item to the server after being selected, to enable the server to provide an interactive content associated with the target list item to a viewer's user client of the current live broadcast's session, and the viewer's user client providing the interactive content in a process of playing the live broadcast's content, and provide a change process of the interactive content according to a material in a process of responding to interactive operation information inputted by a user.

Fifth Embodiment

In the foregoing first embodiment, the solutions of multiple interactive channels are introduced. In practical applications, the solutions of multiple interactive channels can also be applied to other scenarios. For example, similar interactive contents can also be provided on detail pages of product objects or search result pages. At this time, a variety of interactive channels can also be provided to users, so that the users can choose a preferred or convenient interactive channel for inputting interactive operation information.

Figure 11:
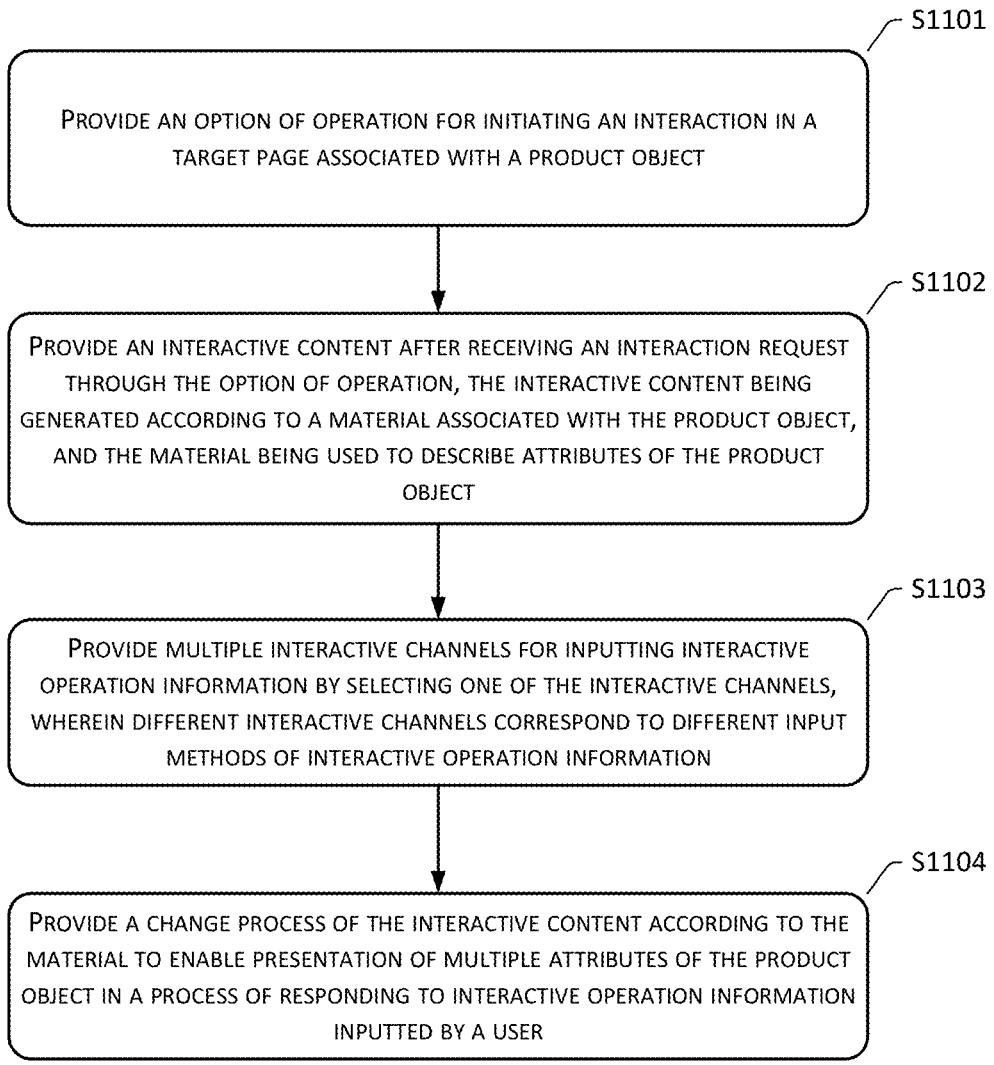
FIG. 11 is a flowchart of a fifth method provided by the embodiments of the present disclosure.

To this end, the fifth embodiment also provides a method for providing product object information. Referring to FIG. 11, the method may specifically include:

S1101: Provide an option of operation for initiating an interaction in a target page associated with a product object.

S1102: Provide an interactive content after receiving an interaction request through the option of operation, the interactive content being generated according to a material associated with the product object, and the material being used to describe attributes of the product object.

S1103: Provide multiple interactive channels for inputting interactive operation information by selecting one of the interactive channels, wherein different interactive channels correspond to different input methods of interactive operation information.

S1104: Provide a change process of the interactive content according to the material to enable presentation of multiple attributes of the product object in a process of responding to interactive operation information inputted by a user.

The interactive channel includes a channel for inputting an interactive operation through air gestures, and at this time, a control instruction may also be generated by recognizing a gesture category of an air gesture, so as to control the change process of the interactive content.

Alternatively, the interactive channel may also include a channel for inputting an interactive operation by means of voice.

In addition, the interactive channel may further include a channel for inputting an interactive operation by operating a touch screen of a terminal device.

In implementations, an option of operation for selecting an interactive channel may also be provided, to allow an input of the interactive operation information through the selected interactive channel.

Alternatively, the interactive content may also include multiple sets of interactive content corresponding to multiple different interactive themes respectively. At this time, multiple tabs may also be provided in an interactive interface, each tab corresponding to a variety of different interactive themes and being used to switch and display interactive contents corresponding to different interactive themes, wherein association relationships between the interactive themes and the interactive channels, and the association relationships are determined according to interactive channels suitable for materials corresponding to the interactive themes. After one of the tabs is selected, the interactive operation information can be received through a target interactive channel associated with an interactive theme corresponding to that tab.

In implementations, the target page includes: a page corresponding to a live broadcast session related to the product object, or a detail information page of the product object, or an information aggregation page including the product object. The information aggregation page includes a search result page, a category page, a recommendation result page, an event venue page, a ranking information page, or a store page.

Sixth Embodiment

Figure 12:
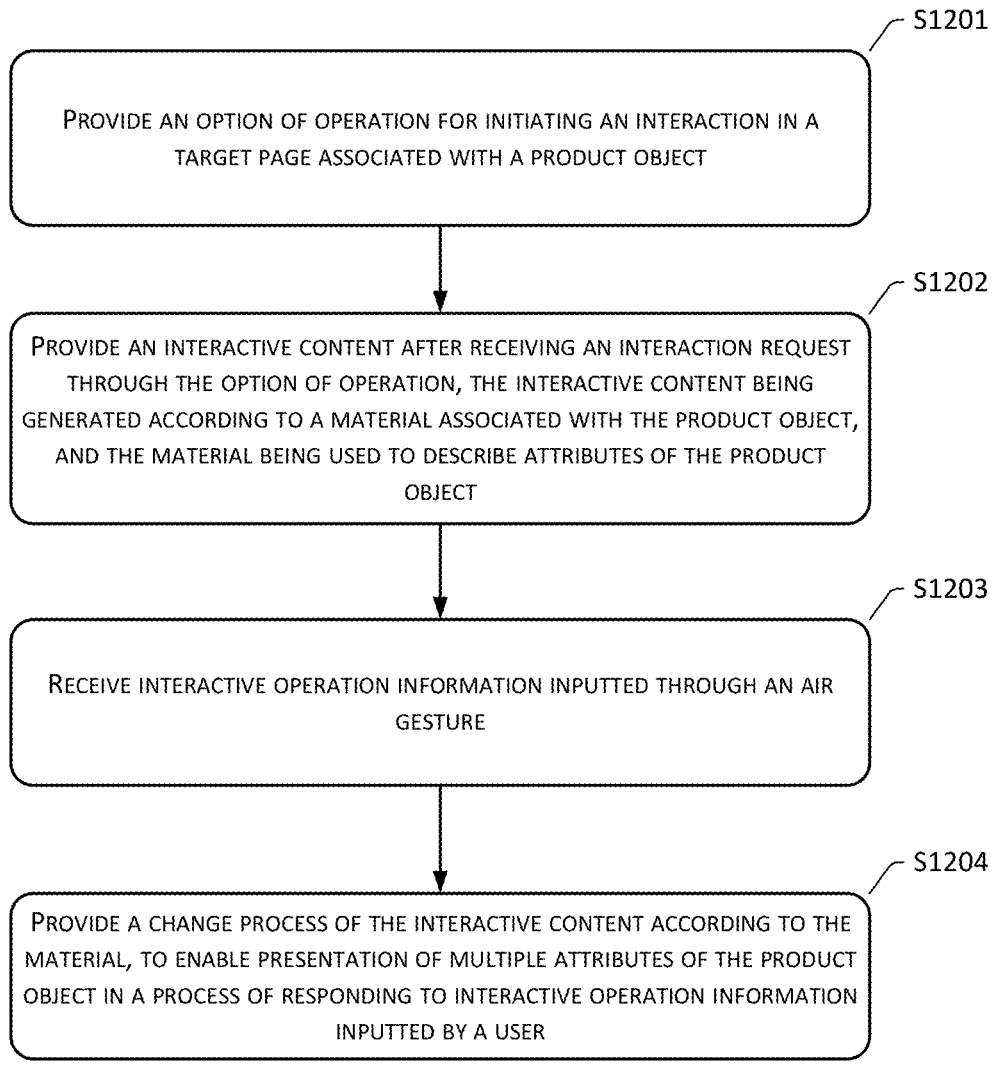
FIG. 12 is a flowchart of a sixth method provided by the embodiments of the present disclosure.

In the foregoing embodiments, the solutions of air gestures are introduced. In practical applications, the solutions of interactions through air gestures can also be applied to other additional scenarios. For example, an interactive content can also be provided on a detail page of a product object. For this type of interactive content, an air interactive channel can also be provided, so that a user can input specific interactive operation information through an air gesture, and so on. Specifically, referring to FIG. 12, the sixth embodiment provides a method for providing product object information, and the method may specifically include:

S1201: Provide an option of operation for initiating an interaction in a target page associated with a product object.

S1202: Provide an interactive content after receiving an interaction request through the option of operation, the interactive content being generated according to a material associated with the product object, and the material being used to describe attributes of the product object.

S1203: Receive interactive operation information inputted through an air gesture.

S1204: Provide a change process of the interactive content according to the material, to enable presentation of multiple attributes of the product object in a process of responding to interactive operation information inputted by a user.

The air gesture includes: a gesture for zooming or rotating the interactive content.

Alternatively, the air gesture includes: a gesture for viewing a function or an effect of an associated product object during use. At this time, the air gesture can be defined according to an operation mode or a movement mode of the product object during use.

Specifically, the target page includes: a page corresponding to a live broadcast session related to the product object, or a detail information page of the product object, or an information aggregation page including the product object. The information aggregation page includes a search result page, a category page, a recommendation result page, an event venue page, a ranking information page, or a store page.

It needs to be noted that, for the parts not described in detail in the foregoing second to sixth embodiments, reference may be made to the description in the first embodiment, and details thereof are not repeated herein.

In addition, the embodiments of the present disclosure may involve the use of user data. In practical applications, when the requirements of applicable laws and regulations of the host countries are fulfilled (for example, users expressly consent, the users are effectively notified, etc.), user-specific personal data is used in scenarios described herein to the extent permitted by the applicable laws and regulations.

Figure 13:
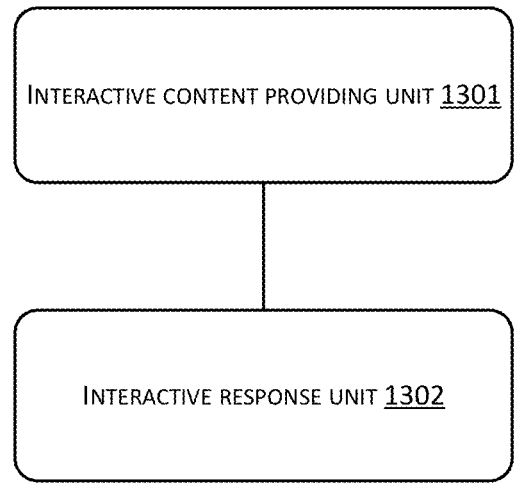
FIG. 13 is a schematic diagram of a first apparatus provided by the embodiments of the present disclosure.

Corresponding to the first embodiment, the embodiments of the present disclosure also provide an apparatus for providing product object information. Referring to FIG. 13, the apparatus may include:
 an interactive content providing unit 1301 configured to provide an interactive content in a process of playing a video content associated with a product object, the interactive content being generated according to a material associated with the product object, and the material being used to describe attributes of the product object; and
 an interactive response unit 1302 configured to provide a change process of the interactive content according to the material in a process of responding to interactive operation information inputted by a user, to enable a presentation of multiple attributes of the product object.

The interactive content providing unit can be specifically configured to:
 provide an option of operation for initiating an interaction in a video playing interface; and creating an interactive interface, and provide the interactive content in the interactive interface after receiving an operation request for initiating the interaction through the option of operation.

In implementations, the apparatus may further include:
 a picture-in-picture display unit configured to reduce a size of a window to which the video playing interface belongs after the interactive interface is created, and display the window above the interactive interface in a form of picture-in-picture.

Alternatively, the interactive content providing unit may be specifically configured to:
 provide a first area and a second area in the video playing interface, wherein the first area is used for playing the video content, and the second area is used for displaying the interactive content.

The video content includes a live broadcast content.

In implementations, the interactive content changes synchronously with the live broadcast content.

Specifically, the interactive content providing unit can be specifically configured to:
 provide an interactive content related to respective attribute information in a corresponding dimension when information of the product object in different dimensions is involved at different moments of the live broadcast content.

In addition, the interactive content providing unit can also be specifically configured to:
 provide a respective interactive content related to a corresponding product object when different product objects are involved in different moments of the live broadcast content.

The live broadcast content includes a replayed live broadcast content;

At this time, the apparatus may also include:
 an interactive theme display unit configured to display multiple interactive themes involved in the interactive content;
 a playback progress jumping unit configured to jump a playback progress to a time point corresponding to a target interactive theme in the live broadcast content for playing after the target interactive theme is selected.

The live broadcast content includes a live broadcast content of a launch site of a new product object;

The interactive content providing unit can be specifically configured to:
 gradually provide respective interactive contents related to attributes of the product object in multiple dimensions as the live broadcast content is played.

Alternatively, the live broadcast content includes a content of a live broadcast used to introduce a published product object.

At this time, the interactive content providing unit can be specifically configured to:
 provide an interactive content selected by a broadcaster during the live broadcast.

The material associated with the product object includes: an image material used to display an appearance of the product object in multiple perspectives or sizes.

At this time, the interactive response unit can be specifically configured to:
 provide a multi-view or multi-dimensional change process of the appearance of the product object in the process of responding to the interactive operation information inputted by the user.

Alternatively, the material associated with the product object includes: an image material used to display multiple states of the product object from an appearance to an internal structure or details.

At this time, the interactive response unit can be specifically configured to:
 provide a change process of the multiple states of the product object from the appearance to the internal structure or details in the process of responding to the interactive operation information inputted by the user.

Alternatively, the material associated with the product object includes: an image material used to display processes of installation and manipulation and/or a use effect of the product object in a use state.

At this time, the interaction response unit can be specifically configured to:

provide the processes of installation and manipulation and/or the use effect of the product object in the use state according to the material in the process of responding to the interactive operation information inputted by the user.

Alternatively, the material associated with the product object includes: an image material used to display a change process of a performance attribute of the product object.

At this time, the interaction response unit can be specifically configured to:

provide the change process of the performance attribute of the product object according to the material in the process of responding to the interactive operation information inputted by the user.

In implementations, the apparatus may further include:

a multi-channel providing unit configured to provide multiple interactive channels, to allow an input of the interactive operation information through one of the interactive channels, wherein different interactive channels correspond to different input modes of interactive operation information.

The interactive channel includes: a channel for inputting interactive operations by means of air gestures.

The apparatus may also include:

a control instruction generation unit configured to generate a control instruction by recognizing a gesture category of an air gesture, to control the change process of the interactive content.

In addition, the apparatus may also include:

a graphic element adding unit configured to add, according to a received air gesture, a graphic element corresponding to the air gesture to an interactive interface; and a prompting unit configured to prompt an execution mode of the air gesture and a corresponding control effect by displaying the graphic element in the interactive interface.

In addition, the interactive channel may also include: a channel for inputting interactive operations by means of voice.

Alternatively, the interactive channel includes: a channel for operations by operating a touch screen of a terminal device.

Furthermore, the apparatus may also include:

a channel selection option providing unit configured to provide an option of operation for selecting an interactive channel to input the interactive operation information through the selected interactive channel.

Alternatively, the apparatus may further include:

a tab providing unit configured to provide multiple tabs, each tab corresponding to a variety of different interactive themes, and being used to switch and display respective interactive contents corresponding to the different interactive themes, wherein association relationships between the interactive themes and the interactive channels exist, the association relationships are determined according to respective interactive channels suitable for materials corresponding to the interactive themes; and an interactive channel determination unit configured to receive the interactive operation information through a target interactive channel associated with an interactive theme corresponding to a tab after one of the tabs is selected.

The interactive operation information inputted by the user includes: interactive operation information for simulating a person to perform a specified action on a physical object of the product object, or interactive operation information for instructing the product object to perform a specified action.

In addition, the apparatus may also include:

an operation option providing unit configured to respectively provide options of operation for expressing approvals or likes for different interactive themes during an interaction process, so as to perform statistics on the users' approvals or likes in units of interactive themes.

Figure 14:
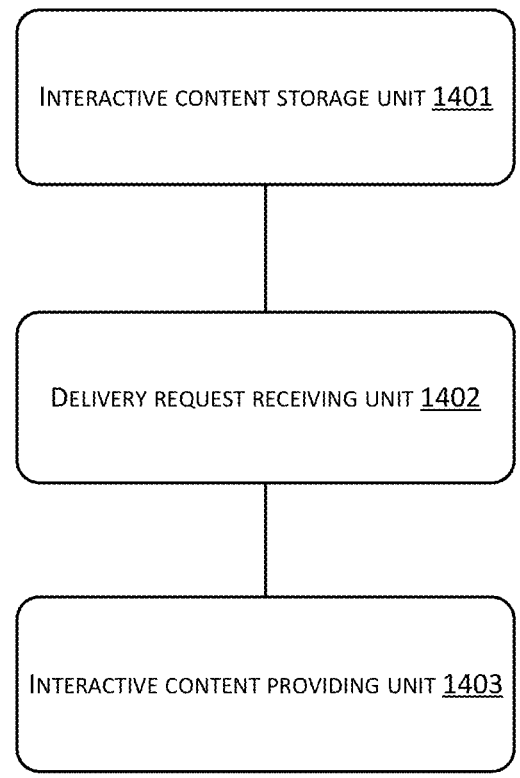
FIG. 14 is a schematic diagram of a second apparatus provided by the embodiments of the present disclosure.

Corresponding to the second embodiment, the embodiments of the present disclosure also provide an apparatus for providing product object information. Referring to FIG. 14, the apparatus may include:

an interactive content storage unit 1401 configured to store an interactive content corresponding to a product object, the interactive content being generated according to a material associated with the product object, and the material being used to describe attributes of the product object;

a delivery request receiving unit 1402 configured to receive a request for delivery of interactive content to a target video content, the request including information of an associated target product object identification and information of a target interactive content identification; and an interactive content providing unit 1403 configured to provide the interactive content corresponding to the target interactive content identification to a viewer's client of the video content, to enable the viewer's client to provide the interactive content in a process of playing the video content, and providing a change process of the interactive content according to the material in process of responding to interactive operation information inputted by a user.

The video content includes a live broadcast content.

Specifically, the live broadcast content includes a live broadcast content of a launch event of a new product object.

The delivery request receiving unit may be specifically configured to: receive a request submitted by a management client for delivering the interactive content to a target live broadcast session.

Alternatively, the live broadcast content includes a live broadcast content used to introduce a published product object.

The delivery request receiving unit may be specifically configured to: receive a request submitted by a client of a broadcaster of the live broadcast content to deliver the interactive content to a target live broadcast session.

Figure 15:
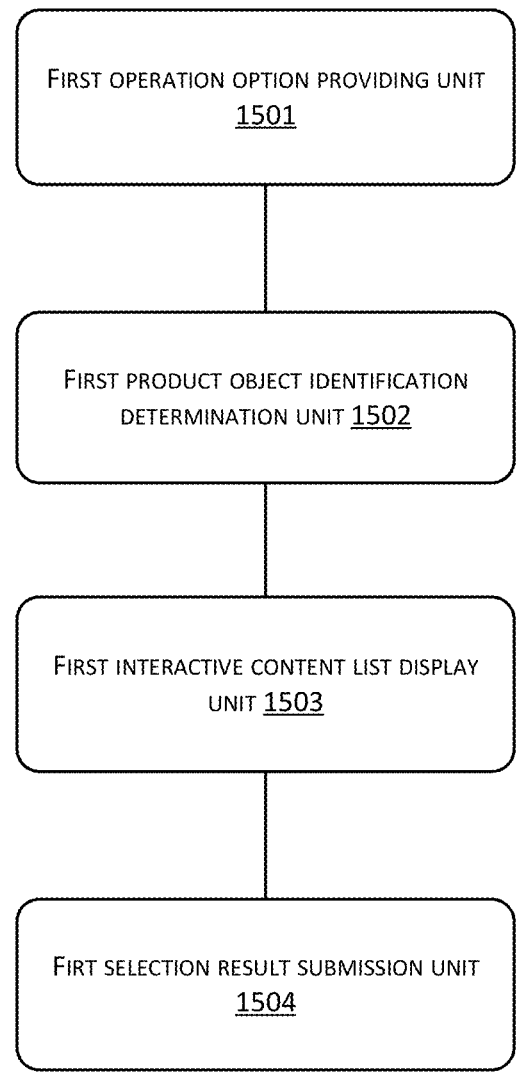
FIG. 15 is a schematic diagram of a third apparatus provided by the embodiments of the present disclosure.

Corresponding to the third embodiment, the embodiments of the present disclosure also provide an apparatus for providing product object information. Referring to FIG. 15, the apparatus may include:

a first operation option providing unit 1501 configured to provide an option of operation for delivering an interactive content according to a progress of a live broadcast during the live broadcast, the interactive content being generated according to a material associated with a product object, and the material being used to describe attributes of the product object;

a first product object identification determination unit 1502 configured to determine an identification of a target live broadcast session and an identification of a target product object after receiving a delivery operation request through the option of operation;

a first interactive content list display unit 1503 configured to obtain and present a list of selectable interactive contents according to the identification of the target product object, wherein the list is used to display identification information of interactive contents associated with the target product object and pre-submitted to a server; and a first selection result submission unit 1504 configured to submit a target list item to the server after being selected, to enable the server to provide an interactive content associated with the target list item to a viewer's client of the target live broadcast session, the viewer's client providing the interactive content in a process of playing a content of the live broadcast, and provide a change process of the interactive content according to the material in a process of responding to interactive operation information inputted by a user.

Figure 16:
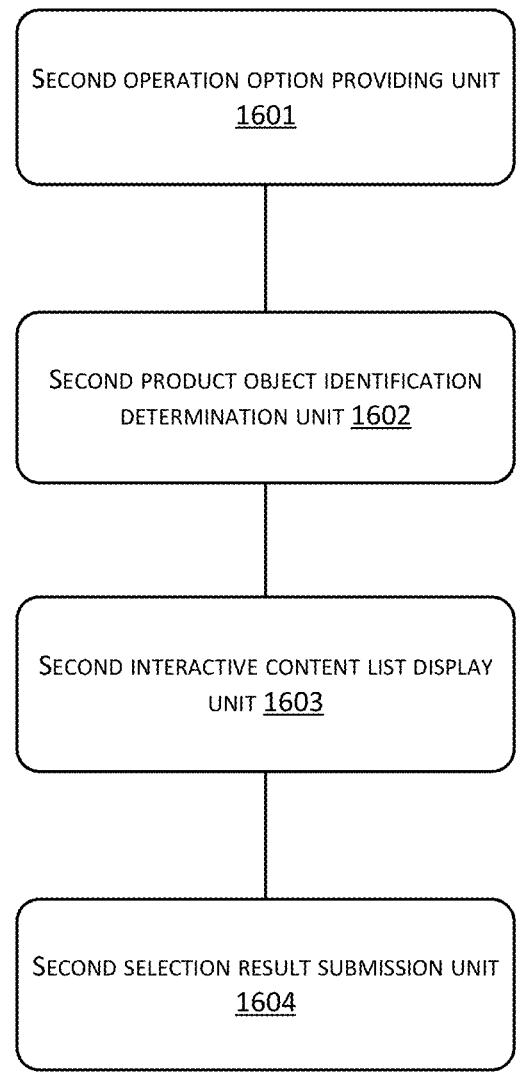
FIG. 16 is a schematic diagram of a fourth apparatus provided by the embodiments of the present disclosure.

Corresponding to the fourth embodiment, the embodiments of the present disclosure also provide an apparatus for providing product object information. Referring to FIG. 16, the apparatus may include:

a second operation option providing unit 1601 configured to provide an option of operation for delivering an interactive content to a current live broadcast's session in a live broadcast interface of a user client of a broadcaster;

a second product object identification determination unit 1602 configured to determine an identification of a target product object after receiving a placing operation request through the option of operation;

a second interactive content list display unit 1603 configured to obtain and display a list of selectable interactive contents according to the identification of the target product object, where the list is used to display identification information of interactive contents associated with the target product object and pre-submitted to a server; and a second selection result submission unit 1604 configured to submit a target list item to the server after being selected, to enable the server to provide an interactive content associated with the target list item to a viewer's user client of the current live broadcast's session, and the viewer's user client providing the interactive content in a process of playing the live broadcast's content, and provide a change process of the interactive content according to a material in a process of responding to interactive operation information inputted by a user.

Figure 17:
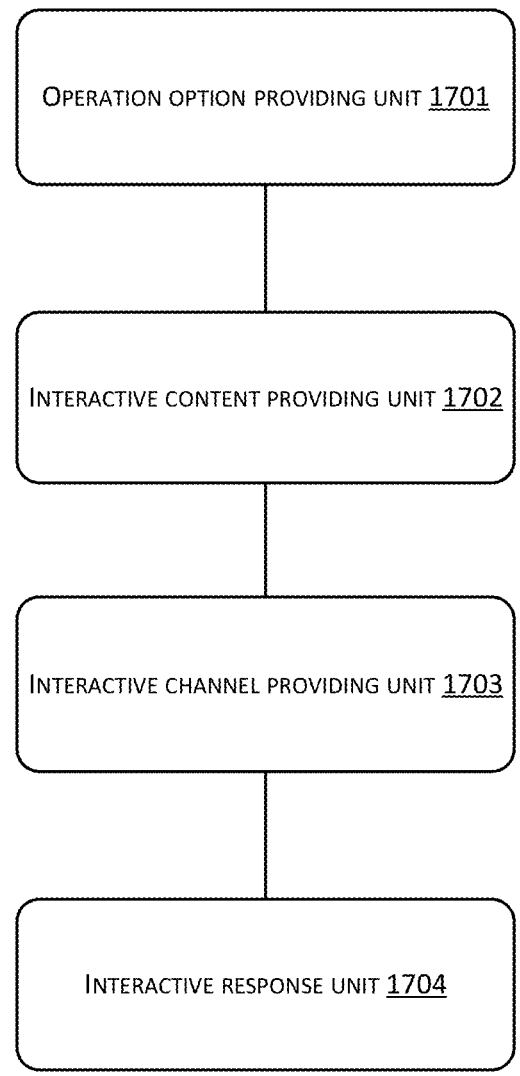
FIG. 17 is a schematic diagram of a fifth apparatus provided by the embodiments of the present disclosure.

Corresponding to the fifth embodiment, the embodiments of the present disclosure further provide an apparatus for providing product object information. Referring to FIG. 17, the apparatus may include:

an operation option providing unit 1701 configured to provide an option of operation for initiating an interaction in a target page associated with a product object;

an interactive content providing unit 1702 configured to provide an interactive content after receiving an interaction request through the option of operation, the interactive content being generated according to a material associated with the product object, and the material being used to describe attributes of the product object;

an interactive channel providing unit 1703 configured to provide multiple interactive channels for inputting interactive operation information by selecting one of the interactive channels, wherein different interactive channels correspond to different input methods of interactive operation information; and an interactive response unit 1704 configured to provide a change process of the interactive content according to the material to enable presentation of multiple attributes of the product object in a process of responding to interactive operation information inputted by a user.

The material includes a variety of different types, and the types include a three-dimensional model, a two-dimensional picture, a video, an audio, or a text.

The interactive channel includes: a channel for inputting an interactive operation by means of air gestures.

The apparatus may also include:

a control instruction generation unit configured to generate a control instruction by recognizing a gesture category of the air gesture to control the change process of the interactive content.

In addition, the interactive channel may also include: a channel for inputting an interactive operation by means of voice.

Alternatively, the interactive channel includes: a channel for inputting an interactive operation by operating a touch screen of a terminal device.

Furthermore, the apparatus may also include:

a channel selection option providing unit configured to provide an option of operation for selecting an interactive channel to input the interactive operation information through the selected interactive channel.

Alternatively, the apparatus may further include:

a tab providing unit configured to provide multiple tabs, each tab corresponding to a variety of different interactive themes, and being used to switch and display respective interactive contents corresponding to the different interactive themes, wherein association relationships between the interactive themes and the interactive channels exist, the association relationships are determined according to respective interactive channels suitable for materials corresponding to the interactive themes; and an interactive channel determination unit is configured to receive, after one of the tabs is selected, the interactive operation information through a target interactive channel associated with an interactive theme corresponding to the tab.

The target page includes: a page corresponding to a live broadcast session related to the product object, or a detail information page of the product object, or an information aggregation page including the product object. The information aggregation page includes a search result page, a category page, a recommendation result page, an event venue page, a ranking information page, or a store page.

Figure 18:
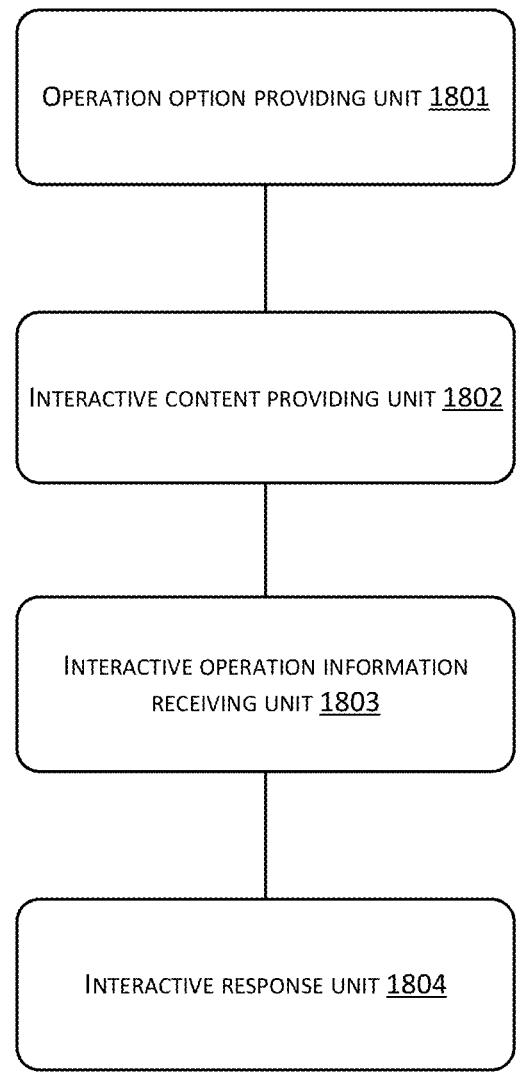
FIG. 18 is a schematic diagram of a sixth apparatus provided by the embodiments of the present disclosure.

Corresponding to the sixth embodiment, the embodiments of the present disclosure further provide an apparatus for providing product object information. Referring to FIG. 18, the apparatus may include:

an operation option providing unit 1801 configured to provide an option of operation for initiating an interaction in a target page associated with a product object;

an interactive content providing unit 1802 configured to provide an interactive content after receiving an interaction request through the option of operation, the interactive content being generated according to a material associated with the product object, and the material being used to describe attributes of the product object;

an interactive operation information receiving unit 1803 configured to receive interactive operation information inputted through an air gesture; and an interactive response unit 1804 configured to provide a change process of the interactive content according to the material, to enable presentation of multiple attributes of the product object in a process of responding to interactive operation information inputted by a user.

The air gesture includes: a gesture for zooming or rotating the interactive content.

Alternatively, the air gesture includes: a gesture for viewing a function or an effect of an associated product object during use.

Alternatively, the air gesture is defined according to an operation mode or a movement mode of the product object during use.

The target page includes: a page corresponding to a live broadcast session related to the product object, or a detail information page of the product object, or an information aggregation page including the product object. The information aggregation page includes a search result page, a category page, a recommendation result page, an event venue page, a ranking information page, or a store page.

In addition, the embodiments of the present disclosure further provide a computer-readable storage medium on which a computer program is stored, and the program, when executed by a processor, implements the method steps described in any one of the foregoing method embodiments.

An electronic device includes:

one or more processors; and a memory associated with the one or more processors, the memory being configured to store program instructions that, when read and executed by the one or more processors, perform the method steps of any one of the foregoing method embodiments.

FIG. 19 exemplarily shows the architecture of an electronic device (or computing device) that is configured to implement the exemplary methods described in the foregoing description. In implementations, the exemplary apparatuses as described in the foregoing description may each include one or more electronic devices. Alternatively, each of the exemplary apparatuses as described in the foregoing description may be included in one or more electronic devices. For example, the device 1900 may be a mobile phone, a computer, a digital broadcasting terminal, a messaging device, a game console, a tablet device, a medical device, a fitness device, a personal digital assistant, aircraft, etc.

Referring to FIG. 19, the device 1900 may include one or more of the following components: a processing component 1902, a memory 1904, a power supply component 1906, a multimedia component 1908, an audio component 1910, an input/output (I/O) interface 1912, a sensor component 1914, and a communication component 1916.

The processing component 1902 generally controls overall operations of the device 1900, such as operations associated with display, phone calls, data communications, camera operations, and recording operations. The processing component 1902 may include one or more processors 1920 to execute instructions to complete all or part of the steps of the methods provided by the technical solutions of the present disclosure. Additionally, the processing component 1902 may include one or more modules that facilitate interactions between the processing component 1902 and other components. For example, the processing component 1902 may include a multimedia module to facilitate interactions between the multimedia component 1908 and the processing component 1902.

The memory 1904 is configured to store various types of data to support operations at device 1900. Examples of such data include instructions for any application programs or methods operating on the device 1900, contact data, phonebook data, messages, pictures, videos, and the like. The memory 1904 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, a magnetic disk, or an optical disk.

In implementations, the memory may include a form of computer readable media such as a volatile memory, a random access memory (RAM) and/or a non-volatile memory, for example, a read-only memory (ROM) or a flash RAM. The memory is an example of a computer readable media.

The computer readable media may include a volatile or non-volatile type, a removable or non-removable media, which may achieve storage of information using any method or technology. The information may include a computer readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The power supply component 1906 provides power to various components of the device 1900. The power supply component 1906 may include a power management system, one or more power supplies, and other components associated with generating, managing, and distributing power to the device 1900.

The multimedia component 1908 includes a screen that provides an output interface between the device 1900 and a user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touches, swipes, and gestures on the touch panel. A touch sensor can sense not only the boundary of a touch or swipe action, but also the duration and pressure associated with the touch or swipe action. In some embodiments, the multimedia component 1908 includes a front-facing camera and/or a rear-facing camera. When the device 1900 is in an operation mode, such as a shooting mode or a video mode, the front-facing camera and/or the rear-facing camera may receive external multimedia data. Each of the front-facing camera and the rear-facing camera can be a fixed optical lens system or have focal length and optical zooming capabilities.

The audio component 1910 is configured to output and/or input audio signals. For example, the audio component 1910 includes a microphone (MIC) that is configured to receive external audio signals when the device 1900 is in an operating mode, such as a call mode, recording mode, and a voice recognition mode. The received audio signal may be further stored in the memory 1904 or transmitted via the communication component 1916. In some embodiments, the audio component 1910 also includes a speaker for outputting audio signals.

The I/O interface 1912 provides an interface between the processing component 1902 and a peripheral interface module. The peripheral interface module may be a keyboard, a click wheel, buttons, or the like. These buttons may include, but are not limited to: a home button, a volume button, a start button, and a lock button.

The sensor component 1914 includes one or more sensors for providing status assessment of various aspects of the device 1900. For example, the sensor component 1914 can detect an open/closed state of the device 1900, relative positioning of components, such as the display and keypad of the device 1900. The sensor component 1914 may also detect a change in the position of the device 1900 or a component of the device 1900, the presence or absence of user contact with the device 1900, orientation or acceleration/deceleration of the device 1900, and the temperature change of the device 1900. The sensor component 1914 may include a proximity sensor configured to detect the presence of nearby objects in the absence of any physical contact. The sensor component 1914 may also include a light sensor, such as a CMOS or CCD image sensor, for use in imaging applications. In some embodiments, the sensor component 1914 may also include an acceleration sensor, a gyroscope sensor, a magnetic sensor, a pressure sensor, or a temperature sensor.

The communication component 1916 is configured to facilitate wired or wireless communication between the device 1900 and other devices. The device 1900 can access a wireless network based on a communication standard, such as WiFi, or a mobile communication network such as 2G, 3G, 4G/LTE, and 5G. In an exemplary embodiment, the communication component 1916 receives broadcast signals or broadcast related information from an external broadcast management system via a broadcast channel. In an exemplary embodiment, the communication component 1916 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 1900 may be implemented by one or more application specific integrated circuits (ASICs), digital signal processors (DSPs), digital signal processing devices (DSPDs), programmable logic devices (PLDs), field programmable gate array (FPGA), controllers, microcontrollers, microprocessors or other electronic components, and used for performing the above methods.

In an exemplary embodiment, a non-transitory computer-readable storage medium including instructions is also provided, such as the memory 1904 including instructions. Such instructions can be executed by the processor 1920 of the device 1900 to complete the methods provided by the technical solutions of the present disclosure. For example, the non-transitory computer-readable storage medium may be ROM, random access memory (RAM), CD-ROM, a magnetic tape, a floppy disk, an optical data storage device, and the like.

From the description of the above embodiments, one skilled in the art can clearly understand that the present disclosure can be implemented by means of software plus a necessary general hardware platform. Based on this understanding, the essence of the technical solutions of the present disclosure or the parts that make contributions to existing technologies can be embodied in a form of a software product. Such computer software product can be stored in a storage medium, such as ROM/RAM, a magnetic disk, CD-ROM, etc., which includes a number of instructions to cause a computing device (which may be a personal computer, a server, or a network device, etc.) to execute the methods described in various embodiments or some parts of the embodiments of the present disclosure.

The various embodiments in this specification are described in a progressive manner. The same and similar parts between the various embodiments may be referenced to each other, and each embodiment focuses on aspects that are different from those of the other embodiments. In particular, for systems or system embodiments, since they are basically similar to the method embodiments, descriptions thereof are relatively simple, and reference may be made to the relevant descriptions of the method embodiments. Furthermore, although various embodiments are described separately, some or all parts of these embodiments may be combined to achieve the purposes of the solutions in the embodiments of the present disclosure. The systems and system embodiments described above are only illustrative, wherein the units that are described as separate components may or may not be physically separated. The components shown as units may or may not be physical units, that is, can be located in one place, or can be distributed over multiple network elements. Some or all of the modules may be selected according to actual needs to achieve the purposes of the solutions in the embodiments of the present disclosure. One of ordinary skill in the art can understand and implement them without making any creative effort.

The methods, apparatuses, and electronic devices for providing product object information that are provided by the present disclosure have been described in detail above. The principles and implementations of the present disclosure are described with specific examples. The descriptions of the above embodiments are used for only helping to understand the methods and the core ideas of the present disclosure. At the same time, for one skilled in the art, based on the ideas of the present disclosure, there can be changes in implementations and application scopes. In conclusion, the content of this specification should not be construed as a limitation on the present disclosure.

The present disclosure can be understood using the following clauses.

Clause 1: A method for providing product object information, comprising: providing an interactive content in a process of playing a video content associated with a product object, the interactive content being generated according to a material associated with the product object, and the material being used to describe attributes of the product object; and providing a change process of the interactive content according to the material in a process of responding to interactive operation information inputted by a user, to enable a presentation of multiple attributes of the product object.

Clause 2: The method of Clause 1, wherein: providing the interactive content comprises: providing an option of operation for initiating interactions in a video playing interface; and creating an interactive interface and providing the interactive content in the interactive interface after receiving an operation request for starting an interaction through the option of operation.

Clause 3: The method of Clause 2, further comprising: reducing a size of a window to which the video playing interface belongs and displaying the window above the interactive interface in a form of picture-in-picture after the interactive interface is created.

Clause 4: The method of Clause 1, wherein: providing the interactive content comprises: providing a first area and a second area in a video playing interface, wherein the first area is used for playing the video content, and the second area is used for displaying the interactive content.

Clause 5: The method of Clause 1, wherein: the video content comprises a live broadcast content.

Clause 6: The method of Clause 5, wherein: the interactive content changes synchronously with the live broadcast content.

Clause 7: The method of Clause 6, wherein: providing the interactive content comprises: providing respective interactive contents related to attribute information in corresponding dimensions when information of the product object in different dimensions is involved at different moments of the live broadcast content.

Clause 8: The method of Clause 6, wherein: providing the interactive content comprises: providing respective interactive contents related to corresponding product objects when different product objects are involved in different moments of the live broadcast content.

Clause 9: The method of Clause 6, wherein: the live broadcast content comprises a replayed live broadcast content; and the method further comprises: displaying multiple interactive themes involved in the interactive content; and jumping a playback progress to a time point corresponding to a target interactive theme in the live broadcast content for playing after the target interactive theme is selected.

Clause 10: The method of Clause 5, wherein: the live broadcast content comprises a live broadcast content of a launch site of a new product object; and providing the interactive content comprises: gradually providing respective interactive contents related to the attributes of the product object in multiple dimensions as the live broadcast content is played.

Clause 11: The method of Clause 5, wherein: the live broadcast content comprises a content of a live broadcast used to introduce a published product object; and providing the interactive content comprises: providing an interactive content selected by a broadcaster during the live broadcast.

Clause 12: The method of Clause 1, wherein: the material associated with the product object includes: an image material used to display an appearance of the product object in multiple perspectives or sizes; and providing the change process of the interactive content according to the material in the process of responding to the interactive operation information inputted by the user comprises: providing a multi-view or multi-dimensional change process of the appearance of the product object in the process of responding to the interactive operation information inputted by the user.

Clause 13: The method of Clause 1, wherein: the material associated with the product object includes: an image material used to display multiple states of the product object from an appearance to an internal structure or details; and providing the change process of the interactive content according to the material in the process of responding to the interactive operation information inputted by the user comprises: providing a change process of the multiple states of the product object from the appearance to the internal structure or details in the process of responding to the interactive operation information inputted by the user.

Clause 14: The method of Clause 1, wherein: the material associated with the product object includes: an image material used to display processes of installation and manipulation and/or a use effect of the product object in a use state; and providing the change process of the interactive content according to the material in the process of responding to the interactive operation information inputted by the user comprises: providing the processes of installation and manipulation and/or the use effect of the product object in the use state according to the material in the process of responding to the interactive operation information inputted by the user.

Clause 15: The method of Clause 1, wherein: the material associated with the product object includes: an image material used to display a change process of a performance attribute of the product object; and providing the change process of the interactive content according to the material in the process of responding to the interactive operation information inputted by the user comprises: providing the change process of the performance attribute of the product object according to the material in the process of responding to the interactive operation information inputted by the user.

Clause 16: The method of any one of Clauses 1 to 15, further comprising: providing multiple interactive channels, to allow an input of the interactive operation information through one of the interactive channels, wherein different interactive channels correspond to different input modes of interactive operation information.

Clause 17: The method of Clause 16, wherein: the interactive channel comprises: a channel for inputting interactive operations by means of air gestures; and the method further comprises: generating a control instruction by recognizing a gesture category of an air gesture, to control the change process of the interactive content.

Clause 18: The method of Clause 17, further comprising: adding, according to a received air gesture, a graphic element corresponding to the air gesture to an interactive interface.

Clause 19: The method of Clause 17, further comprising: prompting an execution mode of an air gesture and a corresponding control effect by displaying a graphic element in an interactive interface.

Clause 20: The method of Clause 16, wherein: the interactive channel comprises: a channel for inputting interactive operations by means of voice.

Clause 21: The method of Clause 16, wherein: the interactive channel comprises: a channel for inputting interactive operations by operating a touch screen of a terminal device.

Clause 22: The method of Clause 16, further comprising: providing an option of operation for selecting an interactive channel to input the interactive operation information through the selected interactive channel.

Clause 23: The method of Clause 16, further comprising: providing multiple tabs, each tab corresponding to a variety of different interactive themes, and being used to switch and display respective interactive contents corresponding to the different interactive themes, wherein association relationships between the interactive themes and the interactive channels exist, the association relationships are determined according to respective interactive channels suitable for materials corresponding to the interactive themes; and receiving the interactive operation information through a target interactive channel associated with an interactive theme corresponding to a tab after one of the tabs is selected.

Clause 24: The method according to any one of Clauses 1 to 15, wherein: the interactive operation information inputted by the user comprises: interactive operation information for simulating a person to perform a specified action on a physical object of the product object, or interactive operation information for instructing the product object to perform a specified action.

Clause 25: The method according to any one of Clauses 1 to 15, further comprising: respectively providing options of operation for expressing approvals or likes for different interactive themes during an interaction process, so as to perform statistics on the users' approvals or likes in units of interactive themes.

Clause 26: A method for providing product object information, comprising: storing, by a server, an interactive content corresponding to a product object, the interactive content being generated according to a material associated with the product object, and the material being used to describe attributes of the product object; receiving a request for delivering an interactive content to a target video content, the request including information of an associated target product object identification and information of a target interactive content identification; and providing the interactive content corresponding to the target interactive content identification to a viewer's client of the video content, to enable the viewer's client to provide the interactive content in a process of playing the video content, and providing a change process of the interactive content according to the material in process of responding to interactive operation information inputted by a user.

Clause 27: The method of Clause 26, wherein: the video content includes a live broadcast content.

Clause 28: The method of Clause 27, wherein: the live broadcast content comprises a live broadcast content of a launch event of a new product object; and receiving the request for delivering the interactive content to the target video content comprises: receiving a request submitted by a management client for delivering the interactive content to a target live broadcast session.

Clause 29: The method of Clause 27, wherein: the live broadcast content includes a live broadcast content used to introduce a published product object; and receiving the request for delivering the interactive content to the target video content comprises: receiving a request submitted by a client of a broadcaster of the live broadcast content to deliver the interactive content to a target live broadcast session.

Clause 30: A method for providing product object information, comprising: providing an option of operation for delivering an interactive content according to a progress of a live broadcast during the live broadcast, the interactive content being generated according to a material associated with a product object, and the material being used to describe attributes of the product object; determining an identification of a target live broadcast session and an identification of a target product object after receiving a delivery operation request through the option of operation; obtaining and presenting a list of selectable interactive contents according to the identification of the target product object, wherein the list is used to display identification information of interactive contents associated with the target product object and pre-submitted to a server; and submitting a target list item to the server after being selected, to enable the server to provide an interactive content associated with the target list item to a viewer's client of the target live broadcast session, the viewer's client providing the interactive content in a process of playing a content of the live broadcast, and providing a change process of the interactive content according to the material in a process of responding to interactive operation information inputted by a user.

Clause 31: A method for providing product object information, comprising: providing an option of operation for delivering an interactive content to a current live broadcast's session in a live broadcast interface of a user client of a broadcaster; determining an identification of a target product object after receiving a placing operation request through the option of operation; obtaining and presenting a list of selectable interactive contents according to the identification of the target product object, where the list is used to display identification information of interactive contents associated with the target product object and pre-submitted to a server; and submitting a target list item to the server after being selected, to enable the server to provide an interactive content associated with the target list item to a viewer's user client of the current live broadcast's session, and the viewer's user client providing the interactive content in a process of playing the live broadcast's content, and providing a change process of the interactive content according to a material in a process of responding to interactive operation information inputted by a user.

Clause 32: A method for providing product object information, comprising: providing an option of operation for initiating an interaction in a target page associated with a product object; providing an interactive content after receiving an interaction request through the option of operation, the interactive content being generated according to a material associated with the product object, and the material being used to describe attributes of the product object; providing multiple interactive channels for inputting interactive operation information by selecting one of the interactive channels, wherein different interactive channels correspond to different input methods of interactive operation information; and providing a change process of the interactive content according to the material to enable presentation of multiple attributes of the product object in a process of responding to interactive operation information inputted by a user.

Clause 33: The method of Clause 32, wherein: the material comprises a variety of different types, and the types include a three-dimensional model, a two-dimensional picture, a video, an audio, or a text.

Clause 34: The method of Clause 32, wherein: the interactive channel comprises: a channel for inputting an interactive operation by means of air gestures; and the method further comprises: generating a control instruction by recognizing a gesture category of the air gesture to control the change process of the interactive content.

Clause 35: The Clause of claim 32, wherein: the interactive channel comprises: a channel for inputting an interactive operation by means of voice.

Clause 36: The method of Clause 32, wherein: the interactive channel comprises: a channel for inputting an interactive operation by operating a touch screen of a terminal device.

Clause 37: The method of Clause 32, further comprising: providing an option of operation for selecting an interactive channel to input the interactive operation information through the selected interactive channel.

Clause 38: The method of Clause 32, wherein: the interactive content comprises multiple sets of interactive content respectively corresponding to different interactive themes; and the method further comprises: providing multiple tabs, each tab corresponding to a variety of different interactive themes, and being used to switch and display respective interactive contents corresponding to the different interactive themes, wherein association relationships between the interactive themes and the interactive channels exist, the association relationships are determined according to respective interactive channels suitable for materials corresponding to the interactive themes; and receiving, after one of the tabs is selected, the interactive operation information through a target interactive channel associated with an interactive theme corresponding to the tab.

Clause 39: The method of any one of Clauses 32 to 38, wherein: the target page comprises: a page corresponding to a live broadcast session related to the product object, or a detail information page of the product object, or an information aggregation page including the product object, the information aggregation page comprising a search result page, a category page, a recommendation result page, an event venue page, a ranking information page, or a store page.

Clause 40: A method for providing product object information, comprising: providing an option of operation for initiating an interaction in a target page associated with a product object; providing an interactive content after receiving an interaction request through the option of operation, the interactive content being generated according to a material associated with the product object, and the material being used to describe attributes of the product object; receiving interactive operation information inputted through an air gesture; and providing a change process of the interactive content according to the material, to enable presentation of multiple attributes of the product object in a process of responding to interactive operation information inputted by a user.

Clause 41: The method of Clause 40, wherein: the air gesture comprises: a gesture for zooming or rotating the interactive content.

Clause 42: The method of Clause 40, wherein: the air gesture comprises: a gesture for viewing a function or an effect of an associated product object during use.

Clause 43: The method of Clause 40, wherein: the air gesture is defined according to an operation mode or a movement mode of the product object during use.

Clause 44: The method of any one of Clauses 40 to 43, wherein: The target page comprises: a page corresponding to a live broadcast session related to the product object, or a detail information page of the product object, or an information aggregation page including the product object, the information aggregation page comprising a search result page, a category page, a recommendation result page, an event venue page, a ranking information page, or a store page.

Clause 45: An apparatus for providing product object information, comprising: an interactive content providing unit configured to provide an interactive content in a process of playing a video content associated with a product object, the interactive content being generated according to a material associated with the product object, and the material being used to describe attributes of the product object; and an interactive response unit configured to provide a change process of the interactive content according to the material in a process of responding to interactive operation information inputted by a user, to enable a presentation of multiple attributes of the product object.

Clause 46: An apparatus for providing product object information, applied in a server, comprising: an interactive content storage unit configured to store an interactive content corresponding to a product object, the interactive content being generated according to a material associated with the product object, and the material being used to describe attributes of the product object; a delivery request receiving unit configured to receive a request for delivery of interactive content to a target video content, the request including information of an associated target product object identification and information of a target interactive content identification; and an interactive content providing unit configured to provide the interactive content corresponding to the target interactive content identification to a viewer's client of the video content, to enable the viewer's client to provide the interactive content in a process of playing the video content, and provide a change process of the interactive content according to the material in process of responding to interactive operation information inputted by a user.

Clause 47: An apparatus for providing product object information, comprising: a first operation option providing unit configured to provide an option of operation for delivering an interactive content according to a progress of a live broadcast during the live broadcast, the interactive content being generated according to a material associated with a product object, and the material being used to describe attributes of the product object; a first product object identification determination unit configured to determine an identification of a target live broadcast session and an identification of a target product object after receiving a delivery operation request through the option of operation; a first interactive content list display unit configured to obtain and present a list of selectable interactive contents according to the identification of the target product object, wherein the list is used to display identification information of interactive contents associated with the target product object and pre-submitted to a server; and a first selection result submission unit configured to submit a target list item to the server after being selected, to enable the server to provide an interactive content associated with the target list item to a viewer's client of the target live broadcast session, the viewer's client providing the interactive content in a process of playing a content of the live broadcast, and provide a change process of the interactive content according to the material in a process of responding to interactive operation information inputted by a user.

Clause 48: An apparatus for providing product object information, comprising: a second operation option providing unit configured to provide an option of operation for delivering an interactive content to a current live broadcast's session in a live broadcast interface of a user client of a broadcaster; a second product object identification determination unit configured to determine an identification of a target product object after receiving a placing operation request through the option of operation; a second interactive content list display unit configured to obtain and display a list of selectable interactive contents according to the identification of the target product object, where the list is used to display identification information of interactive contents associated with the target product object and pre-submitted to a server; and a second selection result submission unit configured to submit a target list item to the server after being selected, to enable the server to provide an interactive content associated with the target list item to a viewer's user client of the current live broadcast's session, and the viewer's user client providing the interactive content in a process of playing the live broadcast's content, and provide a change process of the interactive content according to a material in a process of responding to interactive operation information inputted by a user.

Clause 49: An apparatus for providing product object information, comprising: an operation option providing unit configured to provide an option of operation for initiating an interaction in a target page associated with a product object; an interactive content providing unit configured to provide an interactive content after receiving an interaction request through the option of operation, the interactive content being generated according to a material associated with the product object, and the material being used to describe attributes of the product object; an interactive channel providing unit configured to provide multiple interactive channels for inputting interactive operation information by selecting one of the interactive channels, wherein different interactive channels correspond to different input methods of interactive operation information; and an interactive response unit configured to provide a change process of the interactive content according to the material to enable presentation of multiple attributes of the product object in a process of responding to interactive operation information inputted by a user.

Clause 50: An apparatus for providing product object information, comprising: an operation option providing unit configured to provide an option of operation for initiating an interaction in a target page associated with a product object; an interactive content providing unit configured to provide an interactive content after receiving an interaction request through the option of operation, the interactive content being generated according to a material associated with the product object, and the material being used to describe attributes of the product object; an interactive operation information receiving unit configured to receive interactive operation information inputted through an air gesture; and an interactive response unit configured to provide a change process of the interactive content according to the material, to enable presentation of multiple attributes of the product object in a process of responding to interactive operation information inputted by a user.

Clause 51: A computer-readable storage medium on which a computer program is stored, wherein the program, when executed by a processor, performs the method of any one of Clauses 1 to 44.

Clause 52: An electronic device, comprising: one or more processors; and a memory associated with the one or more processors, the memory configured to store program instructions that, when read and executed by the one or more processors, perform the method of any one of Clauses 1 to 44.

What is claimed is:

1. A method implemented by a computing device, the method comprising:
   providing a video content associated with a product object in a video playing interface;
   providing an interactive content in a process of playing the video content, the interactive content being generated according to a material associated with the product object, and the material being used to describe attributes of the product object;
   creating an interactive interface, and providing the interactive content in the interactive interface after receiving an operation request from a user;
   moving a window in which the video content is displayed from a first position to a second position in the video playing interface after loading the interactive content is completed, shrinking the window as the window moves, and setting a size of the window to a default size when the window reaches the second position;
   displaying the window above the interactive interface in a form of picture-in-picture; and
   providing a change process of the interactive content according to the material in a process of responding to interactive operation information inputted by the user, to enable a presentation of multiple attributes of the product object.

2. The method of claim 1, wherein:
   providing the interactive content comprises: providing an option of operation for initiating creating the interactive interface and providing the interactive content in the interactive interface after receiving the operation request for starting an interaction through the option of operation in the video playing interface.

3. The method of claim 1, wherein: providing the interactive content comprises:
   providing a first area and a second area in the video playing interface, wherein the first area is used for playing the video content, and the second area is used for displaying the interactive content.

4. The method of claim 1, wherein:
   the video content comprises a live broadcast content.

5. The method of claim 4, wherein:
   the interactive content changes synchronously with the live broadcast content.

6. The method of claim 5, wherein: providing the interactive content comprises:
   providing respective interactive contents related to attribute information in corresponding dimensions when information of the product object in different dimensions is involved at different moments of the live broadcast content.

7. The method of claim 5, wherein: providing the interactive content comprises:
   providing respective interactive contents related to corresponding product objects when different product objects are involved in different moments of the live broadcast content.

8. The method of claim 5, wherein:
   the live broadcast content comprises a replayed live broadcast content; and
   the method further comprises:
      displaying multiple interactive themes involved in the interactive content; and
      jumping a playback progress to a time point corresponding to a target interactive theme in the live broadcast content for playing after the target interactive theme is selected.

9. The method of claim 4, wherein:
   the live broadcast content comprises a live broadcast content of a launch site of a new product object; and
   providing the interactive content comprises:
      gradually providing respective interactive contents related to the attributes of the product object in multiple dimensions as the live broadcast content is played.

10. The method of claim 4, wherein:
    the live broadcast content comprises a content of a live broadcast used to introduce a published product object; and
    providing the interactive content comprises:
       providing an interactive content selected by a broadcaster during the live broadcast.

11. The method of claim 1, wherein:
    the material associated with the product object includes:
       an image material used to display an appearance of the product object in multiple perspectives or sizes; and providing the change process of the interactive content according to the material in the process of responding to the interactive operation information inputted by the user comprises:
providing a multi-view or multi-dimensional change process of the appearance of the product object in the process of responding to the interactive operation information inputted by the user.

12. The method of claim 1, wherein:
the material associated with the product object includes:
an image material used to display multiple states of the product object from an appearance to an internal structure or details; and
providing the change process of the interactive content according to the material in the process of responding to the interactive operation information inputted by the user comprises:
providing a change process of the multiple states of the product object from the appearance to the internal structure or details in the process of responding to the interactive operation information inputted by the user.

13. The method of claim 1, wherein:
the material associated with the product object includes:
an image material used to display processes of installation and manipulation and/or a use effect of the product object in a use state; and
providing the change process of the interactive content according to the material in the process of responding to the interactive operation information inputted by the user comprises:
providing the processes of installation and manipulation and/or the use effect of the product object in the use state according to the material in the process of responding to the interactive operation information inputted by the user.

14. The method of claim 1, wherein:
the material associated with the product object includes:
an image material used to display a change process of a performance attribute of the product object; and
providing the change process of the interactive content according to the material in the process of responding to the interactive operation information inputted by the user comprises:
providing the change process of the performance attribute of the product object according to the material in the process of responding to the interactive operation information inputted by the user.

15. The method of claim 1, further comprising:
providing multiple interactive channels, to allow an input of the interactive operation information through one of the multiple interactive channels, wherein different interactive channels correspond to different input modes of interactive operation information.

16. A server comprising:
one or more processors; and
memory storing executable instructions that, when executed by the one or more processors, cause the one or more processors to perform act comprising:
providing a video content associated with a product object in a video playing interface;
providing an interactive content in a process of playing the video content, the interactive content being generated according to a material associated with the product object, and the material being used to describe attributes of the product object;
creating an interactive interface, and providing the interactive content in the interactive interface after receiving an operation request from a user;
moving a window in which the video content is displayed from a first position to a second position in the video playing interface after loading the interactive content is completed, shrinking the window as the window moves, and setting a size of the window to a default size when the window reaches the second position;
displaying the window above the interactive interface in a form of picture-in-picture; and
providing a change process of the interactive content according to the material in a process of responding to interactive operation information inputted by the user, to enable a presentation of multiple attributes of the product object.

17. The server of claim 16, wherein:
providing the interactive content comprises: providing an option of operation for initiating creating the interactive interface and providing the interactive content in the interactive interface after receiving the operation request for starting an interaction through the option of operation in the video playing interface.

18. The server of claim 16, wherein: providing the interactive content comprises:
providing a first area and a second area in the video playing interface, wherein the first area is used for playing the video content, and the second area is used for displaying the interactive content.

19. One or more non-transitory computer readable media storing executable instructions that, when executed by one or more processors, cause the one or more processors to perform acts comprising:
providing a video content associated with a product object in a video playing interface;
providing an interactive content in a process of playing the video content, the interactive content being generated according to a material associated with the product object, and the material being used to describe attributes of the product object;
creating an interactive interface, and providing the interactive content in the interactive interface after receiving an operation request from a user;
moving a window in which the video content is displayed from a first position to a second position in the video playing interface after loading the interactive content is completed, shrinking the window as the window moves, and setting a size of the window to a default size when the window reaches the second position;
displaying the window above the interactive interface in a form of picture-in-picture; and
providing a change process of the interactive content according to the material in a process of responding to interactive operation information inputted by the user, to enable a presentation of multiple attributes of the product object.

* * * * *